US009978487B2

(12) United States Patent
Katter et al.

(10) Patent No.: US 9,978,487 B2
(45) Date of Patent: *May 22, 2018

(54) METHOD FOR FABRICATING A FUNCTIONALLY-GRADED MONOLITHIC SINTERED WORKING COMPONENT FOR MAGNETIC HEAT EXCHANGE AND AN ARTICLE FOR MAGNETIC HEAT EXCHANGE

(75) Inventors: Matthias Katter, Alzenau (DE); Alexander Barcza, Hanau (DE); Volker Zellmann, Linsengericht (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 842 days.

This patent is subject to a terminal disclaimer.

(21) Appl. No.: 13/817,304

(22) PCT Filed: Aug. 17, 2011

(86) PCT No.: PCT/IB2011/053629
§ 371 (c)(1),
(2), (4) Date: Mar. 12, 2013

(87) PCT Pub. No.: WO2012/023108
PCT Pub. Date: Feb. 23, 2012

(65) Prior Publication Data
US 2013/0187077 A1    Jul. 25, 2013

(30) Foreign Application Priority Data
Aug. 18, 2010   (GB) .................................. 1013784.2

(51) Int. Cl.
*H01F 1/01* (2006.01)
*B23P 15/26* (2006.01)

(52) U.S. Cl.
CPC .............. *H01F 1/017* (2013.01); *B23P 15/26* (2013.01); *H01F 1/015* (2013.01); *Y10T 29/4935* (2015.01); *Y10T 428/24992* (2015.01)

(58) Field of Classification Search
CPC .............. H01F 1/012; B22F 3/02; B22F 3/12
See application file for complete search history.

(56) References Cited

U.S. PATENT DOCUMENTS

| 4,408,463 A | 10/1983 | Barclay |
| 6,676,772 B2 | 1/2004 | Saito et al. |

(Continued)

FOREIGN PATENT DOCUMENTS

| GB | 2 113 371 A | 8/1983 | |
| WO | WO 2008099234 A1 * | 8/2008 | ............. H01F 1/015 |

(Continued)

OTHER PUBLICATIONS

International Search Report (PCT/ISA/210) dated Nov. 15, 2011, by the International Bureau of Intellectual Property Organization Patent Office as the International Searching Authority for International Application No. PCT/IB2011/053659.

(Continued)

*Primary Examiner* — Xiaowei Su
(74) *Attorney, Agent, or Firm* — Dickinson Wright PLLC

(57) ABSTRACT

An article for magnetic heat exchange includes a functionally-graded monolithic sintered working component including $La_{1-a}R_a(Fe_{1-x-y}T_yM_x)_{13}H_zC_b$ with a $NaZn_{13}$-type structure. M is one or more of the elements from the group consisting of Si and Al, T is one or more of the elements from the group consisting of Mn, Co, Ni, Ti, V and Cr and R is one or more of the elements from the group consisting of Ce, Nd, Y and Pr. A content of the one or more elements T and R, if present, a C content, if present, and a content of M varies in a working direction of the working component (Continued)

and provides a functionally-graded Curie temperature. The functionally-graded Curie temperature monotonically decreases or monotonically increases in the working direction of the working component.

39 Claims, 21 Drawing Sheets

(56) References Cited

U.S. PATENT DOCUMENTS

| | | | |
|---|---|---|---|
| 7,063,754 | B2 | 6/2006 | Fukamichi et al. |
| 2004/0013593 | A1 | 1/2004 | Takagimi et al. |
| 2006/0076084 | A1* | 4/2006 | Nakajima ............ B22D 11/001 148/101 |
| 2006/0231163 | A1* | 10/2006 | Hirosawa ............ H01F 1/015 148/105 |
| 2009/0194202 | A1* | 8/2009 | Tanigawa ............ B22F 1/0085 148/217 |
| 2011/0048690 | A1* | 3/2011 | Reppel .................. F25B 21/00 165/185 |
| 2011/0140031 | A1 | 6/2011 | Katter et al. |

FOREIGN PATENT DOCUMENTS

| | | | | |
|---|---|---|---|---|
| WO | WO 2009090442 A1 | * | 7/2009 | ............. F25B 21/00 |
| WO | WO 2009138822 A1 | * | 11/2009 | ............. F25B 21/00 |
| WO | WO 2010/038099 A1 | | 4/2010 | |
| WO | WO 2010128357 A1 | * | 11/2010 | ............... C21D 1/74 |

OTHER PUBLICATIONS

Written Opinion (PCT/ISA/237) dated Nov. 15, 2011, by the International Bureau of Intellectual Property Organization Patent Office as the International Searching Authority for International Application No. PCT/IB2011/053659.

C.R.H. Bahl et al., "Design Concepts for a Continuously Rotating Active Magnetic Regenerator", In: Rasmus Bjork: "Designing a magnet for magnetic refrigeration", Mar. 31, 2010, pp. 279-287, XP-002661443.

J. Shen et al., "Reduction of Hysteresis Loss and Large Magnetic Entropy Change in the NaZn13-Type LaPrReSiC Interstitial Compounds", vol. 91, No. 14, Oct. 1, 2007, pp. 142504-142504, XP-012099548.

* cited by examiner

|  | $La_m$ | $Si_m$ | $CO_m$ | $F_e$ | $T_{peak}[°C]$ |
|---|---|---|---|---|---|
| MFP-1112 | 16,7 | 3,48 | 6,55 | 73,24 | 10 |
| MFP-1112 + MFP1113 | 16,7 | 3,38 | 8,24 | 71,65 | 35 |
| MFP-1113 | 16,7 | 3,28 | 9,93 | 70,06 | 60 |

FIG. 19

|  | $T_{peak1}$ | $T_{peak2}$ | $T_{peak3}$ |
|---|---|---|---|
| sort 1 | 10 | 60 | n.a. |
| sort 2 | 10 | 35 | n.a. |
| sort 3 | 10 | 35 | 60 |
| sort 4 | 35 | 60 | n.a. |

FIG. 20

| sintering temperature | 1100°C |
|---|---|
| diffusion times | 4 h |
|  | 16 h |
|  | 64 h |

FIG. 21

|  | time [h] | diffusion zone [mm] | gradient [K/mm] | mean gradient [K/mm] |
|---|---|---|---|---|
| sample 1 | 4 | 4,5 | 15,3 | 10,2 |
|  | 16 | 8,5 | 9,6 | 6 |
|  | 64 | 13 | 6,1 | 3,5 |
| sample 2 | 4 | 4,5 | 7,7 | 4,6 |
|  | 16 | 8,5 | 5 | 2,6 |
|  | 64 | 10 | 3 | 2,1 |
| sample 3 | 4 (l) | 5 | 9,8 | 4,9 |
|  | 4 (r) | 3,5 | 9,6 | 6,8 |
|  | 16 (l) | n.A. | 7 | n.A. |
|  | 16 (r) | n.A. | 6 | n.A. |
|  | 64 | 18 | 3,2 | 2,7 |
| sample 4 | 4 | 5,5 | 9,4 | 4,3 |
|  | 16 | 8 | 4,3 | 2,9 |
|  | 64 | 12 | 2,8 | 2 |

FIG. 22

|  | time [h] | $D \times 10^{-11}$ [m$^2$/s] | center [mm] |
|---|---|---|---|
| sample 1 | 4 | 2,5 | 12,1 |
|  | 16 | 2,5 | 12,4 |
|  | 64 | 2 | 12,2 |
| sample 2 | 4 | 2,5 | 11,8 |
|  | 16 | 2,5 | 12,2 |
|  | 64 | 2 | 12 |
| sample 4 | 4 | 2,5 | 11,8 |
|  | 16 | 2,5 | 11,5 |
|  | 64 | 2 | 11,8 |
| mean value |  | 2,3 | 12 |

FIG. 23

|  | La (wt.%) | Fe (wt.%) | Co (wt.%) | Si (wt.%) | C (wt.%) | $T_C$ |
|---|---|---|---|---|---|---|
| MFP-1161 | 17,6 | 72,2 | 6,8 | 3,4 | 0,06 | 10 |
| MFP-1168 | 17,8 | 72 | 6,6 | 3,4 | 0,36 | 35 |
| MFP-1169 | 17,7 | 71,7 | 6,5 | 3,4 | 0,68 | 60 |

FIG. 24

|  | Powder 1 | Powder 2 | Powder 3 |
|---|---|---|---|
| Sample 5 | MFP-1161 | MFP-1168 |  |
| Sample 6 | MFP-1161 | MFP-1169 |  |
| Sample 7 | MFP-1161 | MFP-1168 | MFP-1169 |

FIG. 25

|  | density (g/cm$^3$) | | |
|---|---|---|---|
|  | 4h | 16h | 64h |
| Sample 5 | 7,062 | 7,265 | 7,057 |
| Sample 6 | 6,78 | 7,15 | 7,279/6,860 |
| Sample 7 | 6,7 | 7,12 | 7,09 |

FIG. 26

| sample | $C_{nominally}$ [%] | $C_{actual}$ [%] |
|---|---|---|
| 1 | 0 | 0,029 |
| 2 | 0,02 | 0,042 |
| 3 | 0,05 | 0,071 |
| 4 | 0,1 | 0,119 |
| 5 | 0,2 | 0,213 |
| 6 | 0,4 | 0,414 |

FIG. 27

| | | density (g/cm$^3$) | | | | | |
|---|---|---|---|---|---|---|---|
| sintering | TS (°C) | 1 | 2 | 3 | 4 | 5 | 6 |
| B | 1080 | 6,992 | 7,058 | 7,02 | 7,06 | | |
| A | 1090 | 7,244 | 7,255 | 7,264 | 7,178 | 7,144 | |
| C | 1100 | 7,308 | 7,274 | 7,201 | 7,255 | 7,148 | 6,546 |
| D | 1120 | | | | | 7,269 | 7,125 |
| E | 1140 | | | | | | 7,255 |

FIG. 28

| | $La_m$ [%] | $Si_m$ [%] | $C_m$ [%] | $CO_m$ [%] | $Fe_m$ [%] | $T_{peak}$ [°C] |
|---|---|---|---|---|---|---|
| MFP-1155 | 16,7 | 3,63 | 0,03 | 3,92 | 75,72 | -29 |
| MFP-1156 | 16,7 | 3,13 | 0,52 | 3,92 | 75,72 | -29 |

FIG. 29

| sample | $C_{nominally}$ [%] | $C_{analys.}$ [%] | $Si_{nominally}$ [%] |
|---|---|---|---|
| 1 | 0,03 | 0,03 | 3,56 |
| 2 | 0,08 | 0,08 | 3,51 |
| 3 | 0,13 | 0,133 | 3,46 |
| 4 | 0,23 | 0,23 | 3,35 |
| 5 | 0,43 | 0,431 | 3,14 |
| 6 | 0,51 | 0,506 | 3,04 |

FIG. 30

| sintering | TS (°C) | density (g/cm³) | | | | | |
|---|---|---|---|---|---|---|---|
| | | 1 | 2 | 3 | 4 | 5 | 6 |
| C | 1060 | 6,544 | 6,672 | 6,807 | 6,757 | 6,614 | 6,549 |
| B | 1080 | 7,164 | 7,170 | 7,221 | 7,220 | | |
| A | 1100 | 7,295 | 7,277 | 7,248 | 7,271 | 7,029 | 6,888 |
| D | 1120 | | | | | 7,231 | 7,241 |

FIG. 31

| sample | $La_m$ | $Si_m$ | $Al_m$ | $Fe_m$ |
|---|---|---|---|---|
| 1 | 16,7 | 0,00 | 3,71 | balance |
| 2 | 16,7 | 0,77 | 2,97 | balance |
| 3 | 16,7 | 1,54 | 2,23 | balance |
| 4 | 16,7 | 2,31 | 1,48 | balance |
| 5 | 16,7 | 3,08 | 0,74 | balance |
| 6 | 16,7 | 3,85 | 0,00 | balance |

FIG. 32

|        | Density (g/cm³) |          |          |          |          |          |
|--------|----------|----------|----------|----------|----------|----------|
| TS (°C) | Sample 1 | Sample 2 | Sample 3 | Sample 4 | Sample 5 | Sample 6 |
| 930    |          |          |          |          |          |          |
| 960    | 7,062    | 6,905    | 6,625    |          |          |          |
| 990    | 7,095    | 7,105    | 7,098    | 6,493    |          |          |
| 1020   |          | 7,17     | 7,098    | 6,861    |          |          |
| 1050   |          |          |          | 7,156    | 6,901    | 6,257    |
| 1080   |          |          |          |          | 7,208    | 6,813    |
| 1110   |          |          |          |          | 7,195    | 7,185    |

FIG. 33

| sample | $La_m$ | $Al_m$ | $Fe_m$  |
|--------|--------|--------|---------|
| 1      | 16,7   | 2,84   | balance |
| 2      | 16,7   | 3,20   | balance |
| 3      | 16,7   | 3,55   | balance |
| 4      | 16,7   | 3,91   | balance |
| 5      | 16,7   | 4,26   | balance |
| 6      | 16,7   | 4,62   | balance |

FIG. 34

|                   | Density (g/cm³) |          |          |          |          |          |
|-------------------|----------|----------|----------|----------|----------|----------|
| Temperature (°C)  | Sample 1 | Sample 2 | Sample 3 | Sample 4 | Sample 5 | Sample 6 |
| 1040              |          |          |          |          |          | 7,036    |
| 1020              | 7,27     | 7,214    | 7,188    | 7,132    | 7,065    | 6,973    |
| 1000              | 7,24     | 7,188    | 7,135    | 7,097    | 7,026    | 6,962    |
| 980               | 7,224    | 7,173    | 7,119    | 7,064    | 6,763    | 6,042    |
| 960               | 7,214    | 7,173    | 7,101    | 6,672    | 5,975    |          |
| 960               | 7,194    | 7,157    | 7,093    |          |          |          |
| 940               | 7,208    | 7,114    | 6,72     |          |          |          |

FIG. 35

METHOD FOR FABRICATING A FUNCTIONALLY-GRADED MONOLITHIC SINTERED WORKING COMPONENT FOR MAGNETIC HEAT EXCHANGE AND AN ARTICLE FOR MAGNETIC HEAT EXCHANGE

A method for fabricating a functionally-graded monolithic sintered working component for magnetic heat exchange and an article for magnetic heat exchange Practical magnetic heat exchangers, such as that disclosed in U.S. Pat. No. 6,676,772 for example, may include a pumped recirculation system, a heat exchange medium such as a fluid coolant, a chamber packed with particles of a working material which displays the magnetocaloric effect and a means for applying a magnetic field to the chamber. The working material can be said to be magnetocalorically active.

The magnetocaloric effect describes the adiabatic conversion of a magnetically induced entropy change to the evolution or absorption of heat. Therefore, by applying a magnetic field to a magnetocalorically active working material, an entropy change can be induced which results in the evolution or absorption of heat. This effect can be harnessed to provide refrigeration and/or heating.

Magnetic heat exchangers are, in principle, more energy efficient than gas compression/expansion cycle systems. They are also considered environmentally friendly as chemicals such as chlorofluorocarbons (CFC) which are thought to contribute to the depletion of ozone levels are not used.

In practice, a magnetic heat exchanger requires magnetocalorically active material having several different magnetic phase transition temperatures in order to provide cooling over a wider temperature range. In addition to a plurality of magnetic phase transition temperatures, a practical working medium should also have a large entropy change in order to provide efficient refrigeration and/or heating.

A variety of magnetocalorically active phases are known which have magnetic phase transition temperatures in a range suitable for providing domestic and commercial air conditioning and refrigeration. One such magnetocalorically active material, disclosed for example in U.S. Pat. No. 7,063,754, has a $NaZn_{13}$-type crystal structure and may be represented by the general formula $La(Fe_{1-x-y}T_yM_x)_{13}H_z$, where M is at least one element of the group consisting of Si and Al, and T may be one or more of transition metal elements such as Co, Ni, Mn and Cr. The magnetic phase transition temperature of this material may be adjusted by adjusting the composition.

Consequently, magnetic heat exchanger systems are being developed in order to practically realise the potential advantages provided by these magnetocalorically active materials. However, further improvements are desirable to enable a more extensive application of magnetic heat exchange technology.

An article for magnetic heat exchange is provided that comprises a functionally-graded monolithic sintered working component comprising $La_{1-z}R_a(Fe_{1-x-y}T_yM_x)_{13}H_zC_b$ with a $NaZn_{13}$-type structure. M is one or more of the elements from the group consisting of Si and Al, T is one or more of the elements from the group consisting of Mn, Co, Ni, Ti, V and Cr and R is one or more of the elements from the group consisting of Ce, Nd, Y and Pr. A content of the one or more elements T and R, if present, a C content, if present, a H content, if present, and a content of M varies in a working direction of the working component and provides a functionally-graded Curie temperature.

The functionally-graded Curie temperature monotonically decreases or monotonically increases in the working direction of the working component.

A working component for an article for magnetic heat exchange is provided as a monolithic sintered working component with a functionally-graded Curie temperature. Rather than a single freestanding monolithic working component that comprises a plurality of layers each comprising a differing Curie temperature which increases or decreases in a stepped fashion over the length of the working component, the working component of the present invention has a functionally-graded Curie temperature gradient that increases or decreases in a smooth, stepless fashion.

The phrases monotonically increasing and monotonically decreasing are used in the mathematical sense and describe a function in which order is preserved, i.e. an increment is always non-positive or always non-negative.

Therefore, the working component according to the present invention fails to include sharp transitions in Curie temperature as is the case for a working component with a stepped increase or a stepped decrease in Curie temperature. This feature leads to an increase in the efficiency of the working component and the heat exchange medium is continuously cooled or heated as it flows in the working direction of the working component due to the continuously decreasing or increasing Curie temperature.

A sharp transition in Curie temperature is defined as a change of more than 10° C. over a distance of 0.5 mm.

In a further embodiment, the monotonically increasing or monotonically decreasing Curie temperature comprises no non-increasing portions and no non-decreasing portions, respectively.

In a further embodiment, the Curie temperature gradient, that is Curie temperature per unit length of the working direction, of the working component is generally linear.

In an embodiment, the functionally-graded Curie temperature decreases or increases over 80% of a length of the working component with a gradient that lies within ±50%, or within ±20%, of a linear function of Curie temperature per unit length determined over 100% of the length of the working component.

The linear function of Curie temperature per unit length is defined as the difference between the Curie temperature at one end of the working component and the Curie temperature at the opposing end of the working component divided by the distance between the two ends. The Curie temperature decreases or increases over a length of the working component such that this length provides the working direction of the working component when it is used in a system for magnetic heat exchange.

In order to allow for variations from an exact linear function in a practical sense, the gradient of the Curie temperature over the 80% of the length of the working component at any one point may lie within ±50%, or within ±20% of the perfect linear function of the Curie temperature per unit length determined over 100% of the length of the working component.

The working component according to the invention, therefore, includes a continuously increasing or a continuously decreasing Curie temperature over its length which leads to an increase in efficiency of cooling and/or heating compared to a step-like discontinuous increase or decrease in Curie temperature.

Due to edge effects, the Curie temperature may only monotonically increase of monotonically decrease over 80% of the total length of the working component. This 80% or 90% percent of a length the working component may be centred on the centre of the length of the working component so that the outermost end portions comprising 10% or 5%, respectively, of the total length have a Curie temperature gradient that lies outside of this defined function.

Similarly, due to edge effects, the Curie temperature may only increase or decrease with a gradient that lies within 50% of the linear function of Curie temperature per unit length over 80% or 90% of the length of the working component. This 80% or 90% percent of a length of the working component may be centred on the centre of the length of the working component so that the outermost end portions comprising 10% or 5%, respectively, of the total length have a Curie temperature gradient that lies outside of this defined linear function.

A magnetocalorically active material is defined herein as a material which undergoes a change in entropy when it is subjected to a magnetic field. The entropy change may be the result of a change from ferromagnetic to paramagnetic behaviour, for example. The magnetocalorically active material may exhibit, in only a part of a temperature region, an inflection point at which the sign of the second derivative of magnetization with respect to an applied magnetic field changes from positive to negative.

A magnetocalorically passive material is defined herein as a material which exhibits no significant change in entropy when it is subjected to a magnetic field.

A magnetic phase transition temperature is defined herein as a transition from one magnetic state to another. Some magneto-calorically active phases such as $La_{1-a}R_a(Fe_{1-x-y}T_yM_x)_{13}H_zC_b$ exhibit a transition from paramagnetic to ferromagnetic which is associated with an entropy change. For these materials, the magnetic transition temperature can also be called the Curie temperature.

The Curie temperature is determined by the composition of the magnetocalorically active $La_{1-a}R_a(Fe_{1-x-y}T_yM_x)_{13}H_zC_b$ phase which has a $NaZn_{13}$-type structure. In particular, the Curie temperature may be determined by selecting the elements T and/or R and/or M and/or C.

In a further embodiment, the Curie temperature may also be selected by including hydrogen into the magnetocalorically actine $La_{1-a}R_a(Fe_{1-x-y}T_yM_x)_{13}H_zC_b$ phase. The hydrogen content may also vary along the length of the working component in order to provide a varying Curie temperature along the length of the working component. In further embodiments, the hydrogen content is sufficiently uniform along the length of the working component that the variation in the further elements R, T and M results in the varying Curie temperature.

The content of the element M may be adjusted and, therefore, may vary depending on the type of the element T and R and/or the amount of the element T and R. The content of the element M may be adjusted in order to provide a sinter activity that is similar throughout the length of the working component despite the varying composition and varying Curie temperature. This has the effect of producing a density that is similar throughout the length of the working component despite the varying composition and varying Curie temperature.

By having a similar sinter activity throughout the length of the working component, cracks and delamination of portions of the working component can be avoided and differing Curie temperatures can be provided within a single monolithic sintered working component.

In one particular embodiment, M is silicon and the silicon content is adjusted and, therefore, may vary depending on the type of the element T and R and/or the amount of the element T and R in order to provide a sinter activity that is similar throughout the length of the working component.

The functionally-graded Curie temperature may have an undulating structure about a perfectly linear function. Therefore, in a further embodiment, the functionally-graded Curie temperature may increase or decrease over 80% of the length of the working component with a gradient that lies within ±20% or ±10% of the linear function of Curie temperature per unit length determined over 100% of the length of the working component.

The average Curie temperature gradient may lie within 5° C. per millimeter to 0.5° C. per millimeter over 80% of the length working component. For a working component of 20 mm, this average Curie temperature gradient provides an effective cooling range of between 100° C. to 10° C.

As discussed above, the M content, e.g. the silicon content, of the working component varies along the length of the working component in order to provide a sinter activity which is more uniform along the length of the working component despite the different contents of the elements T and R and C, if present, along the length of the working component providing the functionally-graded Curie temperature. The uniform sinter activity provides a working component with a uniform density along the length of the working component.

In an embodiment, the working component has a density d in a defined portion of 5 volume percent to 10 volume percent of the total volume of the working component. This density d of the defined portion lies within a range of ±5% or ±2% of an average total density, $d_{av}$, of the working component.

The M content, x, may lie within the range of 0.05 to 0.2 throughout the volume of the working component. If M is silicon, the silicon content, x, may lie within the range of 0.05 to 0.2 throughout the volume of the working component.

In a particular embodiment, the monolithic working component comprises Co and/or Mn and the silicon content, $Si_{act}$, lies within ±5% of $Si_m$, wherein $Si_m = 3.85 - 0.0573 \times Co_m - 0.045 \times Mn_m^2 + 0.2965 \times Mn_m$, wherein $Si_m$ is the metallic weight fraction of silicon, $Mn_m$ is the metallic weight fraction of manganese, $Co_m$ is the metallic weight fraction of cobalt.

As used herein, the subscript m denotes the metallic weight fraction. The metallic weight fractions are calculated depending on the oxygen and nitrogen content. The metallic weight fraction is defined herein as the result of a calculation separating and removing the rare earth, RE, content which is bonded in the form of RE oxides and RE nitrides from the total composition according to the following formulas (for RE=La):

$$La_2O_3 = 6.79 * O$$

$$LaN = 10.9 * N$$

$$f = \frac{100}{100 - La_2O_3 - LaN}$$

Consequently, $$La_m = (La - 5.8*O - 9.9*N)*f$$

$$Si_m = Si*f$$

$$Al_m = Al*f$$

$$Co_m = Co * f$$

$$Mn_m = Mn * f$$

where the subscript m denotes the metallic weight fraction and La, O, N, Si, Al, Co and Mn and so on denote the weight percent of this element.

In a first approximation, the metallic RE content can also be calculated for La-rich alloys as:

$$RE_m = (RE - 5.8*O - 9.9*N) \times \frac{100}{100 - 6.8*O - 10.9*N}$$

For Si, Co, Mn and so on, the metallic contents are close to the total content as the factor f is around 1.02. However, for the RE element, there is a larger difference. For example, in the embodiments described here, a content of around 18 wt % La is used to provide a metallic content of 16.7 wt % which corresponds to the stoichiometry of the 1:13 phase.

Cobalt and/or manganese contents and the silicon content which are defined as above provide differing Curie temperatures by varying the amount of cobalt and/or manganese. A uniform sinter activity and, therefore, density in the final working component is achieved by varying the silicon content according to the weight fractions of cobalt and manganese, if present.

In a further embodiment, $Si_{act}$ lies within ±2% of $Si_m$.

In a particular embodiment, the element R is optional and the element T is present such that $0 \leq a \leq 0.5$ and $0.003 \leq y \leq 0.2$.

In a further particular embodiment, the element R is present and the element T is optional such that $0.05 \leq a \leq 0.5$ and $0 \leq y \leq 0.2$.

In a further particular embodiment, both T and R are present such that $0.05 \leq a \leq 0.5$ and $0.003 \leq y \leq 0.2$.

The element carbon may also be included. It is thought that carbon is accommodated interstitially in the $NaZn_{13}$-type structure. However, it is also possible that some, if not all, of the carbon may be accommodated on lattice sites of the $NaZn_{13}$ structure. The carbon content may be $0 \leq b \leq 1.5$ or $0 < b \leq 1.5$ or $0.05 \leq b \leq 0.5$.

The element hydrogen may also be included. It is thought that hydrogen is accommodated interstitially in the $NaZn_{13}$-type structure. The hydrogen content may be $0 \leq z \leq 3$ or $1.4 < z \leq 3$.

In one embodiment, the hydrogen content is kept as high as possible, for example as close as possible to the saturation limit of hydrogen in the magnetocaloric active phase.

In one particular embodiment, the magnetocaloric active $La_{1-a}R_a(Fe_{1-x-y}T_yM_x)_{13}H_zC_b$ phase includes only the element T and, in particular where the element T is cobalt or nickel, the magnetocalorically active phase is free of hydrogen.

In a further particular embodiment, T is one or more of the group consisting of Mn, Ti, V and Cr and R is one or more of the group consisting of Ce, Nd and Pr and a hydrogen content of $1.4 < z \leq 3$ is included.

This embodiment may be used if the Curie temperature range and, therefore, the working temperature range of the working component including one or more of the elements Mn, Ti, V and Cr and R is one or more of the group consisting of Ce, Nd and Pr is too low. By including hydrogen, the Curie temperature of all of the different compositions of the working component is increased so that the working temperature range of the working component is shifted to a higher temperature, without losing the advantages of the generally linear increase or decrease in the Curie temperature.

In a further embodiment, the hydrogen content of the monolithic working component monotonically increases or monotonically decreases over 80% or more of the working component and provides a functionally-graded Curie temperature that increases or decreases monotonically over 80% or more of the working component.

For some applications, a hydrogen content of less than a threshold values, for example 90% of the hydrogen saturation value, can lead to the $NaZn_{13}$-phase having a stability that is insufficient for the particular application. In these embodiments, the hydrogen content is varied within the range considered to give suitable stability of the $NaZn_{13}$-phase.

A method for fabricating a functionally-graded monolithic sintered working component for magnetic heat exchange is provided that comprises the following. Powder comprising elements in amounts suitable to form a $La_{1-a}R_a(Fe_{1-x-y}T_yM_x)_{13}H_zC_b$ phase with a $NaZn_{13}$-type structure is provided, wherein T is one or more of the elements from the group consisting of Mn, Co, Ni, Ti, V and Cr, M is Si and, optionally, Al, and R is one or more of the elements from the group consisting of Ce, Nd, Y and Pr. The powder is formed to provide a green body such that the amount of the one or more elements T and R, the amount of C, if present, and the amount of M varies in a pre-determined direction of the green body. The green body is sintered and subsequently heat treated at a temperature $T_{diff}$ and for a time t selected to allow diffusion of one or more of the elements T or R and C and a working component is formed that comprises a functionally-graded Curie temperature that monotonically increases or monotonically decreases in the pre-determined direction.

The monolithic sintered working component has a functionally-graded Curie temperature that is formed by diffusion. Since the functionally-graded Curie temperature is formed by diffusion, the form or shape of the Curie temperature variation along the length of the working component is more uniform in a smooth continuous sense than in the green body which may comprise individual layers of very different compositions with very different Curie temperature. For example, adjacent layers of the green body may have a difference in Curie temperature of 1° C. to 50° C.

After the diffusion reaction, the individual layers no longer have sharp interfaces between them and may even no longer be distinguishable so that the Curie temperature increases or decreases in a continuous manner from one end of the working component to the other. Such a monolithic functionally-graded working component has the advantage that the heat exchange efficiency of the working component is improved as the Curie temperature monotonically increases or monotonically decreases along the length of the working component as the working medium is continuously heated or cooled, respectively.

In an embodiment, the temperature $T_{diff}$ and the time t are selected to provide a functionally-graded Curie temperature that decreases or increases with a gradient that lies within ±50% of a linear function over 80% of a length of the working component. In this embodiment, the functionally-graded Curie temperature has a generally linear form that lies at most from perfectly linear function of ±20%, or ±10%. The efficiency of the heat exchange may be further increased the more linear the decrease or increase of the Curie temperature.

The monolithic sintered working component may be fabricated by heating the working component at a temperature $T_{diff}$ and for a time t to allow the diffusion of one or more of the elements T, R and C, if present. The functionally-graded Curie temperature is produced by diffusion of the elements so as to provide the working component with a continuously varying composition along its length and a monotonically varying Curie temperature along its length.

Such a diffusion reaction can, in principle, be produced by providing at least two portions, each comprising a magnetocatoric active phase or elements having a suitable stoichiometric ratio to form a magnetocaloric active phase and differing contents of T, R and/or carbon to provide a differing Curie temperature. The two or more portions may be placed in contact with one another and heat treated for sufficient time that diffusion between the two portions occurs thus joining the portions together and producing a gradient of the elements T, R and/or carbon and a functionally-graded Curie temperature within a single working component.

The diffusion length required to produce a monotonically increasing or decreasing Curie temperature depends on the size of the portions. As used herein, macroscopic diffusion is used to describe a portion length, l, of at least 0.5 mm and a diffusion length of l, i.e. at least 0.5 mm. Microscopic diffusion is used to describe a portion length, l, of less than 0.5 mm and a diffusion length of less than 0.5 mm.

The temperature, $T_{diff}$, and the time, t, may be chosen to produce a diffusion length of around the length of the portions. For example, if the two portions of differing Curie temperature have a length of 10 mm, $T_{diff}$ and t may be selected so that the elements, T, R and C, have a diffusion length of 10 mm.

If the two or more portions provide a stacked layered structure in the green body, the layers may have a thickness of 10 µm to 50 µm, for example. In this example, $T_{diff}$ and the time t may be selected so that the elements, T, R and C, have a shorter diffusion length of 10 µm to 50 µm.

In an embodiment, the mean composition of a portion having a length, l, may be defined by the ratio of numbers of alternating layers with different compositions. For example, a first portion could include a layered structure with two layers of composition A alternating with one layer of composition B to give a ratio A:B of 2:1 and a second portion could include a layered structure with one layer of composition A alternating with one layer of composition B to give a ratio A:B of 1:1. In these embodiments, the diffusion length is comparable to the total length of each portions, l, and not the smaller thickness of the individual layers making up the portion.

In the case of powders of differing composition being mixed in varying proportions in order to provide the varying composition in the working direction of the working component, the diffusion length may be even shorter if the particle size of the powders is less than 10 µm.

The temperature $T_{diff}$ and/or the time t used for the diffusion reaction may be selected so as to provide a particular diffusion rate of the elements T and/or R and/or carbon. In a particular embodiment, the temperature $T_{diff}$ is selected to provide a diffusion rate of the elements T and/or C of at least $2 \times 10^{-11}$ m²/s. In a further particular embodiment, the temperature $T_{diff}$ is selected to provide a diffusion rate of the element C of at least $1 \times 10^{-10}$ m²/s.

The temperature $T_{diff}$ may be 900° C.≤$T_{diff}$≤1200° C. or 1050° C. $T_{diff}$≤1150° C. and/or the time t may be 1 h≤t≤100 h. Generally speaking, the time may be reduced for higher temperatures in order to achieve a preselected degree of diffusion.

The varying composition of the green body may be provided in different ways.

In an embodiment, a plurality of powders is provided which comprise differing R, T, M and C contents selected to provide differing Curie temperatures when suitably heat treated to form the $NaZn_{13}$ structure.

Two or more basic powders having differing compositions may be weighed and mixed and then differing proportions of these two or more basic powders may be mixed together to provide yet further intermediate compositions. This approach may be useful if the basic powders are produced by milling a solidified melt in order to reduce the number of different compositions which have to be produced by melt casting.

In order to form the green body from the plurality of different powders, layers of the plurality of powders may be stacked such the content of R, T, M and/or C increases or decreases in a direction of the stack. In other words, a stack of layers of differing composition is built up vertically such that the content of the elements R, T, M and/or C increases or decreases in a vertical direction.

The plurality of powders may also be mixed with a liquid and, optionally, a binder and/or a dispersant to form a plurality of slurries or pastes of differing composition. According to one example embodiment, the viscosity of the slurry or paste is between 200 mPas and 100,000 mPas. These slurries or pastes may then be sequentially applied to form a stack in which the content of the elements R, T, M and/or C increases or decreases in the direction in which the stack is built up. The slurries or pastes may be applied by screen printing or doctor-blading.

The use of slurries or pastes may be useful to apply thinner layers, for example layers having a thickness of 10 µm to 60 µm. The use of thinner layers of differing composition may be useful in reducing the diffusion time between adjacent layers which leads to produce a suitably linear Curie temperature gradient.

In an embodiment, the composition is varied in the stacking direction by varying the numbers of layers of differing composition applied to the stack in the stacking direction. In this way the average composition may be varied in the stacking direction using a more limited number of slurries of differing composition. For example, the following arrangement could be used: 5 layers of slurry A, 3 layers of slurry B, 3 layers of slurry A, 3 layers of slurry B, 1 layer of slurry A and 5 layers of slurry B.

If a liquid and/or binder and/or plasticizer are used, it may be removed before the green body is sintered by heat treatment, for example at a temperature of less than 500° C.

In a further embodiment, varying proportions of the powders are mixed with one another before being arranged in a former such that the content of R, T, M or C of the powder in the former increases or decreases over a length of the former. Powders may be mixed with one another by introducing varying proportions of powders of differing composition into a sieve/conveyor structure which shakes the powders, mixing them with one another before depositing them in the former. The composition may vary parallel to a height of the former or along the length of an elongate former.

In a further embodiment, varying proportions of the powders are introduced in the former such that the content of R, T, M or C increases or decreases in the insertion direction. In this embodiment, the powders of differing composition and in varying proportion are introduced directly in the former rather than being mixed with one another before being placed in the former. The ratio of the powders may be varied during the filling process gradually resulting in a monotonic variation of the mean composition, thus reducing the required diffusion times.

The powder may be formed to a green body by applying pressure, for example by die pressing or by isostatic pressing. After the pressure is applied, the green body may be sintered at a temperature of 900° C. or above to densify the green body. In an embodiment, the temperature is chosen so that a density of greater than 90% of the theoretical density is achieved in the working component.

The amount of M may be adjusted depending on the type of the element T and/or R as well as adjusted depending on the amount of the element T and/or R in order to provide a sinter activity for the particular composition which is similar to the sinter activity of the other compositions used to produce the working component. This provides a monolithic working component with a similar density throughout its volume despite the differing composition.

In an embodiment, Co and/or Mn are present, M is Si and the amount of Si is selected according to $Si_m=3.85-0.0573 \times Co_m-0.045 \times Mn_m^2+0.2965 \times Mn_m$, wherein $Si_m$ is the metallic weight fraction of silicon, $Mn_m$ is the metallic weight fraction of manganese and $Co_m$ is the metallic weight fraction of cobalt.

In a further embodiment, Mn and/or Ce(MM) are present, M is Si and the amount of Si is selected according to $Si_m=3.85-0.045 \times Mn_m^2+0.2965 \times Mn_m+(0.198-0.066 \times Mn_m) \times Ce(MM)_m$, wherein $Si_m$ is the metallic weight fraction of silicon, $Mn_m$ is the metallic weight fraction of manganese and $Ce(MM)_m$ is the metallic weight fraction of cerium misch metal.

In a further group of embodiments, the working component is further hydrogenated after sintering.

The $La_{1-a}R_a(Fe_{1-x-y}T_yM_x)_{13}H_z$ phase has a $NaZn_{13}$-type structure and, if it includes hydrogen, the hydrogen atoms are thought to occupy interstitial sites in the $NaZn_{13}$-type structure. The hydrogen can be introduced into these interstitial sites after formation of the $La_{1-a}R_a(Fe_{1-x-y}T_yM_x)_{13}$ phase. The Curie temperature of a substantially fully hydrogenated ternary $La(Fe,Si)_{13}H_z$ phase may be around +85° C. The Curie temperature of the $La_{1-a}R_a(Fe_{1-x-y}T_yM_x)_3H_z$ phase may be adjusted by adjusting the hydrogen content as well as by substitution of metallic elements for La and Fe.

Hydrogenation may be performed by heat treating the working component under a hydrogen partial pressure of 0.5 to 2 bars. The hydrogen partial pressure may be increased during the hydrogenation heat treatment. The hydrogenation may comprise heat treating at a temperature in the range of 0° C. to 100° C. and, preferably, in the range 15° C. to 35° C. A final heat treatment at temperatures of less than 100° C. in a hydrogen atmosphere, preferably at 0.5 to 2 bars has been found to reliably produce working components with the hydrogen content, z, of at least 90% of the hydrogen saturation value, $z_{sat}$.

In further embodiments, the hydrogenation comprises a dwell at a temperature $T_{hyd}$, wherein 400° C.$\leq T_{hyd} \leq$600° C. and may comprise a dwell at a temperature $T_{hyd}$ in the range 400° C.$\leq T_{hyd} \leq$600° C. followed by cooling in a hydrogen atmosphere to a temperature of less than 100° C.

In further embodiments, the working component is only subjected to hydrogen gas above a threshold temperature. In one embodiment, the hydrogenation comprises heating the working component from a temperature of less than 50° C. to at least 300° C. in an inert atmosphere and introducing hydrogen gas only when a temperature of at least 300° C. is reached. The working component is maintained in a hydrogen containing atmosphere at a temperature in the range 300° C. to 700° C. for a selected duration of time, and cooled to a temperature of less than 50° C. to provide a second working component. This method has been found to result in second working components with a hydrogen content, z, of 90% or more of the hydrogen saturation content, $z_{sat}$, and also in mechanically stable second working components.

In further embodiments of a method in which the working component is subjected to hydrogen only at temperatures above a threshold temperature, the working component may be cooled to a temperature of less than 50° C. in a hydrogen-containing atmosphere.

In particular, it is found that if hydrogen is first introduced at temperatures lower than around 300° C., the working component may disintegrate into pieces or at least lose its previous mechanical strength. However, these problems may be avoided by first introducing hydrogen when the working component is at a temperature of at least 300° C.

Alternatively, or in addition, hydrogen gas is introduced only when a temperature of 400° C. to 600° C. is reached. After hydrogenation, the working component may comprise at least 0.18 wt % hydrogen.

In further embodiments, the hydrogen content of the working component monotonically increases or monotonically decreases along 80% or more of the working component so as to produce a Curie temperature gradient that monotonically increases or monotonically decreases.

The hydrogen content may be varied as a function of position along the working direction of the working component by heat treating a hydrogenated working component in a temperature gradient so as to remove hydrogen from the working component as a function of the temperature and of position if the working direction extends in the direction of the temperature gradient.

The end of the working component placed at the higher temperature end of the temperature gradient has a lower hydrogen content after the heat treatment due to a higher hydrogen loss compared to the opposing end of the working component that was placed at the lower end of the temperature gradient and was subjected to a lower hydrogen loss.

A multi-step heat treating process may also be used to heat treat the powder mixture and produce the working component. In an embodiment, the multi-step heat treatment comprises a first dwell at $T_{sinter}$ for a time $t_1$ in vacuum and a time $t_2$ in argon, followed by cooling to a temperature $T_1$, wherein $T_1 < T_{sinter}$, followed by a second dwell at $T_1$ for a time $t_3$ followed by rapid cooling. Typical parameter ranges for such a multi-step heat treatment may be 900° C.$\leq T_{sinter} \leq$1200° C., 900° C.$\leq T_1 \leq$1080° C. and/or 0.5 h$\leq t_1 \leq$10 h and/or 0.5 h$\leq t_2 \leq$10 h and/or 1 h$\leq t_3 \leq$20 h and/or rapid cooling at a rate of 5° C./min to 200° C./min.

Embodiments and specific examples will now be described in connection with the following figures and Tables.

FIG. 19 includes Table 1 which illustrates the composition of three starting powders with a cobalt composition selected to give differing Curie temperatures.

FIG. 20 includes Table 2 which illustrates the Curie temperatures of four multi-layer green bodies.

FIG. 21 includes Table 3 which illustrates sinter and diffusion heat treatments.

FIG. 22 includes Table 4 which summarizes the measured diffusion zones and Curie temperature gradient.

FIG. 23 includes Table 5 which summarizes the calculated diffusion coefficient of cobalt in the working components.

FIG. 24 includes Table 6 which summarizes the compositions of the three starting powders of the second set of examples.

FIG. 25 includes Table 7 which summarizes the composition of multi-layer green bodies were fabricated from layers of the powders of Table 6.

FIG. 26 includes Table 8 which summarizes the density of green bodies heat treated at 1120° C. for 4 hours, 16 hours or 64 hours.

FIG. 27 includes Table 9 which summarizes the compositions of examples of differing carbon content.

FIG. 28 includes Table 10 which summarizes the sinter temperatures and the density of the samples of Table 9 after heat treatment at different temperatures.

FIG. 29 includes Table 11 which summarizes the compositions of a set of examples in which carbon is substituted for silicon.

FIG. 30 includes Table 12 which summarizes the compositions of six samples of differing carbon and silicon content.

FIG. 31 includes Table 13 which summarizes the sinter temperature and density measured for the samples of Table 12.

FIG. 32 includes Table 14 which summarizes the compositions of six samples of varying Si and Al content.

FIG. 33 includes Table 15 which summarizes the density of the samples of Table 14 after heat treatment at different temperatures.

FIG. 34 includes Table 16 which summarizes the compositions of six samples of varying Al content.

FIG. 35 includes Table 17 which summarizes the density of the samples of table 16 after heat treatment at different temperatures.

Figure 1:
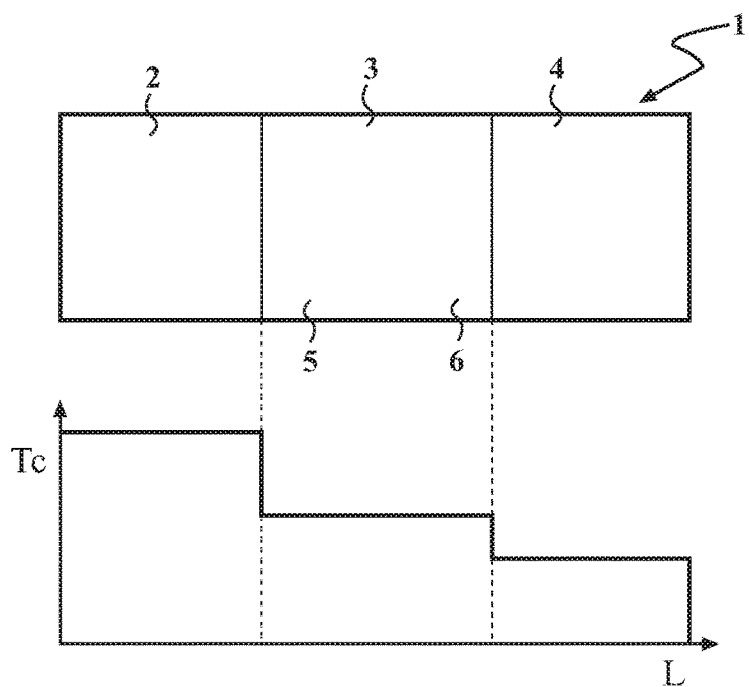
FIG. 1 illustrates a green body according to a first embodiment.

FIG. 1 illustrates a green body 1 according to a first embodiment which may be heat treated to form a working component for a magnetic heat exchanger which includes a functionally-graded Curie temperature.

The green body 1 includes three portions 2, 3, 4. Each portion includes elements having a stoichiometry suitable to form a $La_{1-a}R_a(Fe_{1-x-y}T_yM_x)_{13}$ phase. The composition of each portion differs from that of the others and is selected to give a preselected Curie temperature, $T_c$. In one particular example, the Curie temperature of the first portion 2 is 60° C., the Curie temperature of the central portion 3 is 30° C. and the Curie temperature of the third portion 4 is 15° C. The green body 1 therefore has three separate portions with a composition selected to produce a Curie temperature which decreases along the length of the green body 1 in a step like fashion as is illustrated in FIG. 1.

The Curie temperature of the three portions can be preselected by selecting the composition of the cobalt content of the $La_{1-a}R_a(Fe_{1-x-y}T_ySi_x)_{13}$ phase according to the following equation:

$$T_c = 14.82 \times Co_m - 87.1 \qquad (1)$$

wherein $Co_m$ is the metallic weight fraction of cobalt.

Additionally, the silicon content of the three portions 2, 3, 4 of the green body 1 is adjusted so that each of the portions has a sinter activity that is similar. The silicon content is selected according to the following equation:

$$Si_m = 3.85 - 0.0573 \times Co_m \qquad (2)$$

wherein $Si_m$ is the metallic weight fraction of silicon and $Co_m$ is the metallic weight fraction of cobalt.

The similar sinter activity enables the three portions 2, 3, 4 of the green body 1 to be formed as integral parts of a single monolithic sintered working component after heat treatment of the green body 1. A monolithic working component having a plurality of Curie temperatures which decrease over the length of the working component is provided.

In order to form a monolithic working component from the green body 1, the green body 1 is sintered. The sintered body 1 is subsequently heat treated at a temperature $T_{diff}$ which lies within the range of 900° C. to 1200° C. for a time within a range of 1 hour to 100 hours. The temperature and the time of the heat treatment are selected so as to allow diffusion of one or more elements along the length of the green body 1 and form a working component 7.

Figure 2:
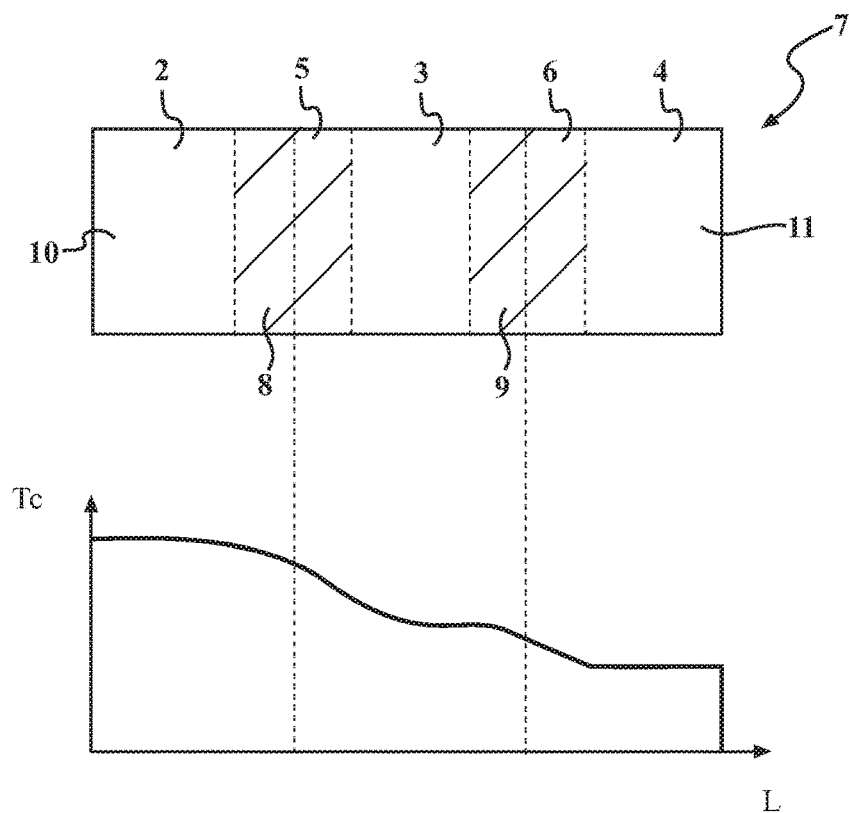
FIG. 2 illustrates a working component for magnetic heat exchange fabricated from the green body of FIG. 1.

In particular, a diffusion zone 8, 9 is created at the interfaces 5, 6 between adjacent portions 2, 3 and 3, 4 respectively as a result of the heat treatment, as is illustrated in FIG. 2. The Curie temperature of the working component 7 when viewed as a function of the length no longer has a stepped structure as in the green body illustrated in FIG. 1 but has a smooth undulating decrease which is generally linear, as is illustrated in FIG. 2. The Curie temperature monotonically decreases from left to right in the view of FIG. 2.

The heat treatment conditions may be selected so that this decrease in the Curie temperature is as linear as possible. The heat treatment temperature and the time may be selected depending on the diffusion coefficients of the particular elements included in the basic LaFe$_{13}$ phase which is or are used to adjust the Curie temperature and depending on the thickness of the portions of differing composition included in the green body.

As a Curie temperature gradient is desirable across the length of the working component, the diffusion time should not be selected to be too long as eventually the entire working component would have the same composition and a uniform Curie temperature across its length.

By providing a monolithic sintered working component 7 with a functionally-graded Curie temperature which decreases in a generally linear fashion from one end 10 of the working component 7 to the other end 11 of the working component 7, the efficiency of the heat exchange can be increased over that possible by a stepped decrease in the Curie temperature as, for example, illustrated in FIG. 1.

In a first set of embodiments, the Curie temperature of the working component was adjusted by adjusting the cobalt content. Table 1 illustrates the composition of three starting powders with a cobalt composition selected to give a Curie temperature of 10° C., 35° C. and 60° C. The silicon composition was also selected according to equation (2) above.

Four green bodies were formed including two or three of these powders in a layered structure. The Curie temperatures of the three green bodies are summarised in Table 2. The first green body is fabricated using powders having a composition selected to provide a Curie temperature of 10° C. and 60° C. The second green body is fabricated from the powders having a composition selected to have a Curie temperature of 10° C. and 35° C. The third green body is fabricated using three powders having the differing Curie temperatures of 10° C., 35° C. and 60° C. The fourth green body is fabricated using powders having compositions for the two Curie temperatures of 35° C. and 60° C.

In each case, the different powders were placed in layers in a press. The powder with the lowest Curie temperature was placed in the press first and pressed with a pressure of around 0.15 tonne/cm². A flat surface was produced on which the second powder was introduced without mixing of the two powders. After the layers were built, the green body was then pressed with a pressure of 2 tonne/cm².

The green bodies were given a sintering and diffusion heat treatment at 1100° C. for 4 hours, 16 hours or 64 hours as summarized in Table 3. These times were chosen so that the diffusion length is expected to be double that of the previous time as the diffusion distance/length is generally expected to be proportional to the square root of the diffusion time. In particular, the green bodies were heated to 1100° C. for 3 hours in a vacuum and the remaining dwell time in argon before furnace cooling to 800° C. where the temperature was held for a further 8 hours before fast cooling to room temperature.

The annealing at 800° C. was performed in order to decompose the La(Fe,Co, Si)$_{13}$ phase in order to allow machining of the working component without forming undesirable cracks. This method uses the teaching of the published application WO2010/038099 A1 which is hereby incorporated by reference in its entirety.

In order to investigate the diffusion between the different portions of the working components, the working components were cut into slices with a spark erosion technique. The working components were cut so that some slices extend over the length of the working component. Others were cut in a perpendicular direction so that slices along the length of the working component could be tested to establish the Curie temperature of this particular slice. The individual slices were around 1 mm thick and the total length of the working component was around 25 mm.

To recombine the magnetocalorically active La$_{1-a}$R$_a$(Fe$_{1-x-y}$T$_y$Si$_x$)$_{13}$ phase, the slices were heat treated at 1050° C. for 4 hours and quickly cooled.

Figure 3:
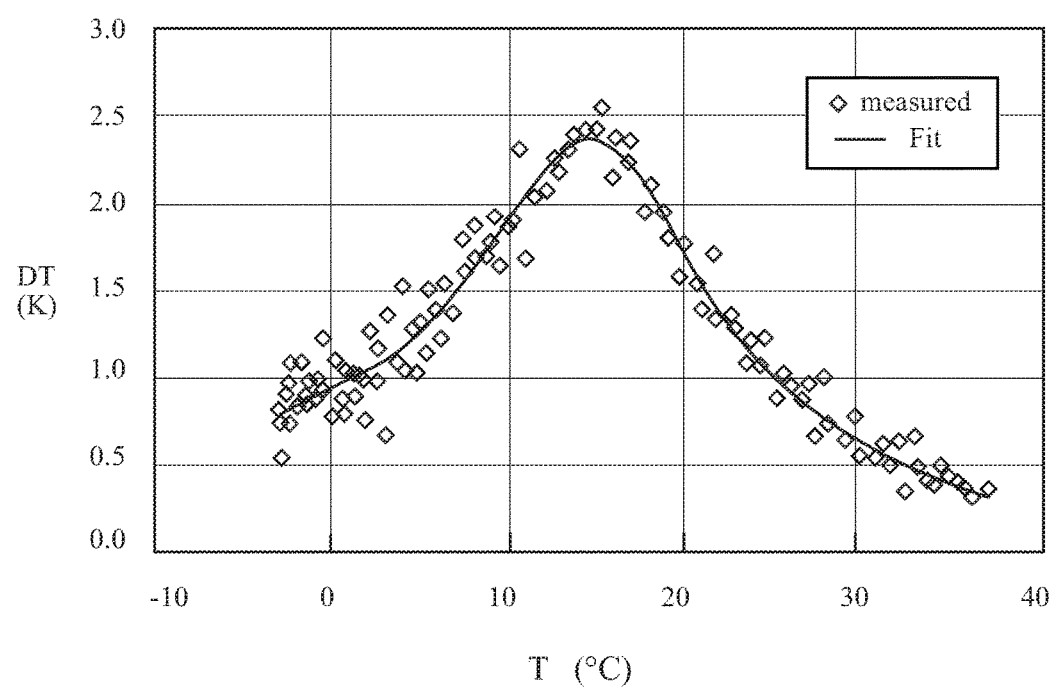
FIG. 3 illustrates a typical curve of temperature change as a function of temperature for a single slice of a working component.
Figure 4A:
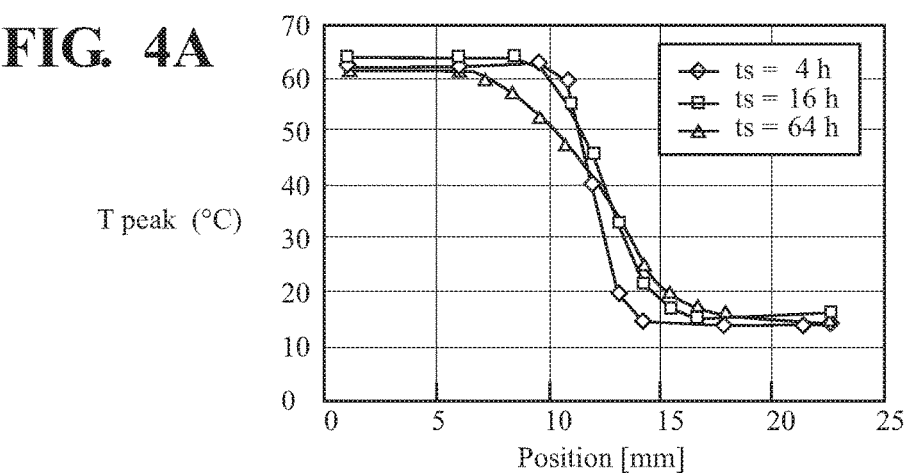
FIGS. 4A-4C illustrate graphs of Curie temperature, maximum temperature change and full width at half maximum value as a function of the position of the slice in a first working component.
Figure 4B:
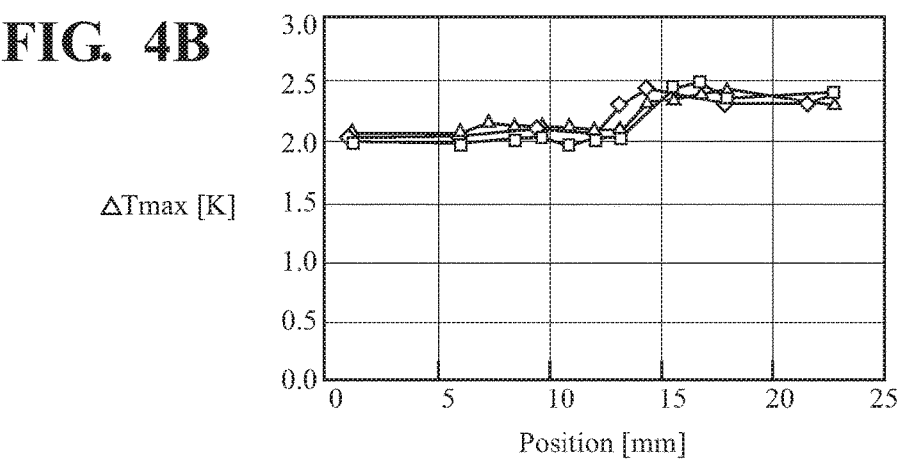
Figure 4C:
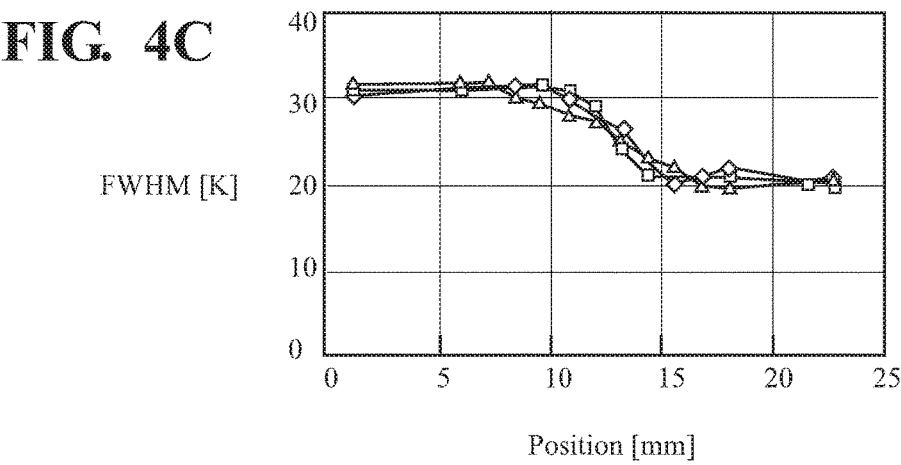
Figure 5A:
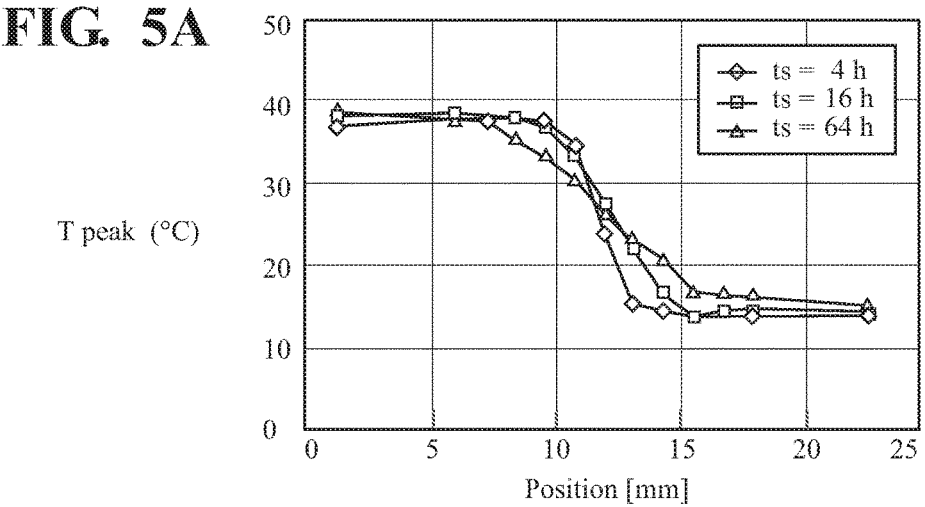
FIGS. 5A-5C illustrate graphs of Curie temperature, maximum temperature change and full width at half maximum value as a function of the position of the slice in a second working component.
Figure 5B:
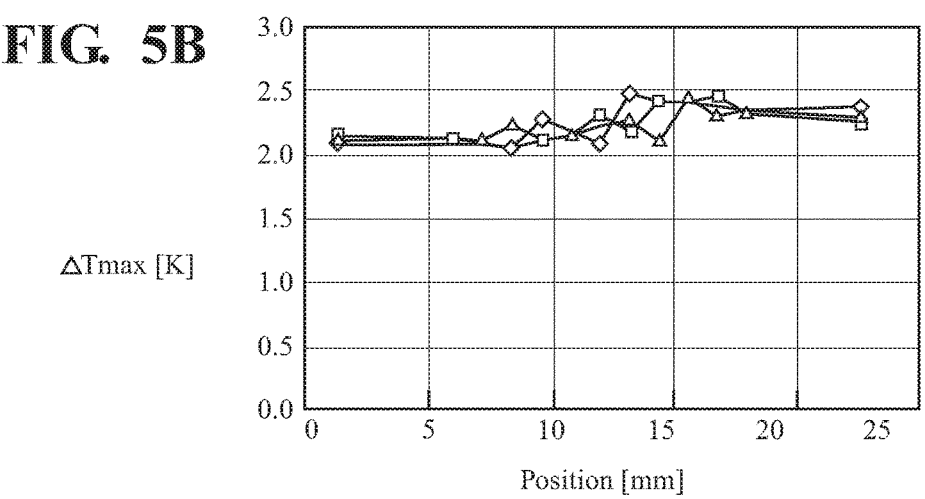
Figure 5C:
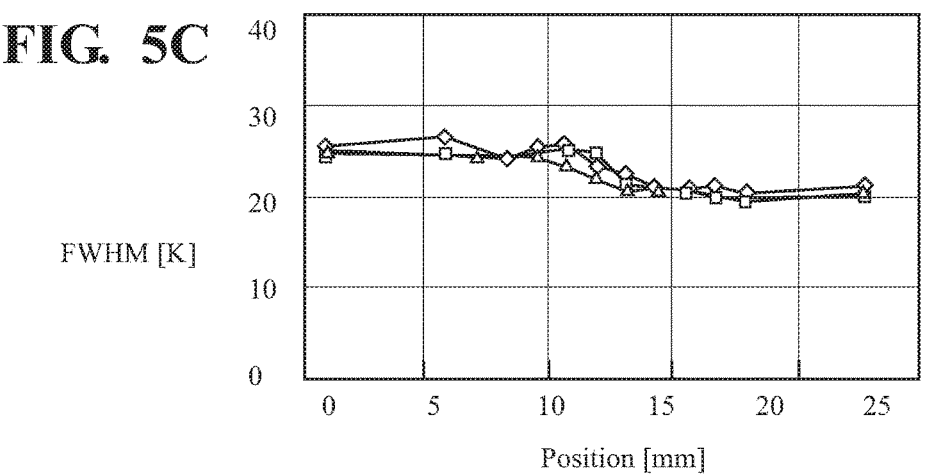
Figure 6A:
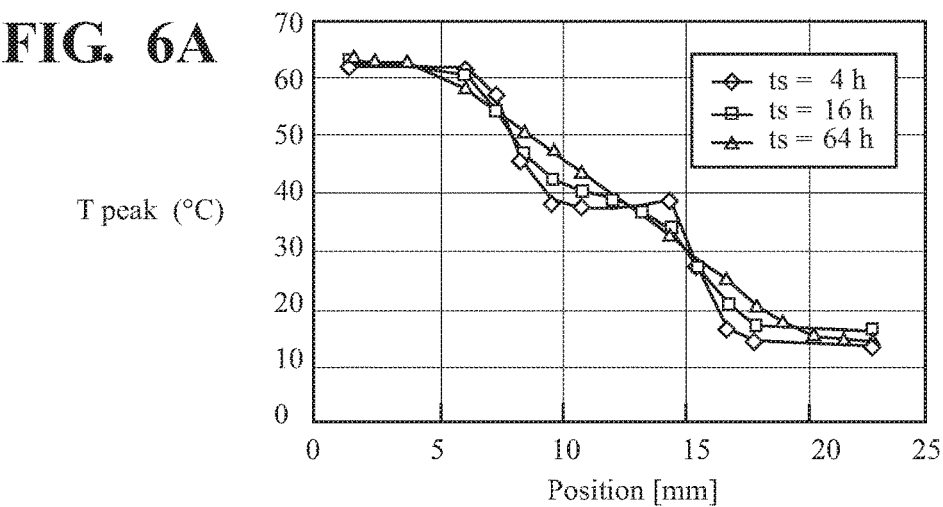
FIGS. 6A-6C illustrate graphs of Curie temperature, maximum temperature change and full width at half maximum value as a function of the position of the slice in a third working component.
Figure 6B:
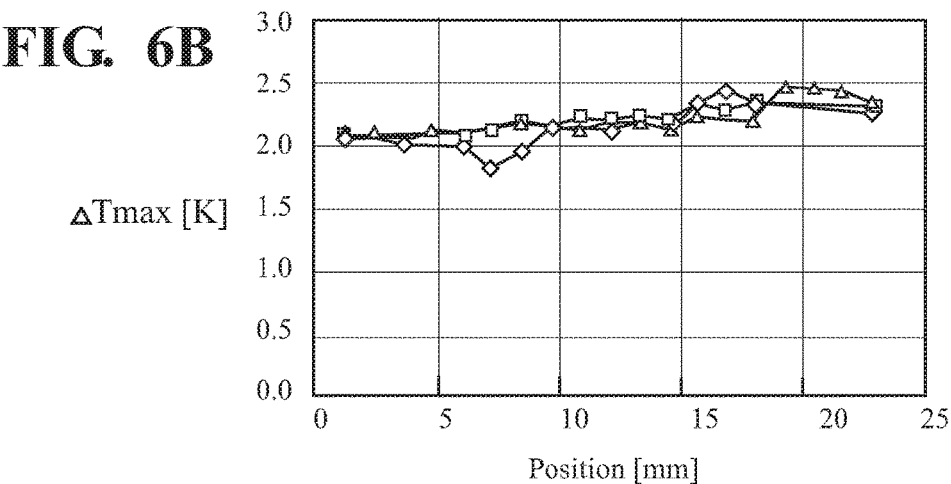
Figure 6C:
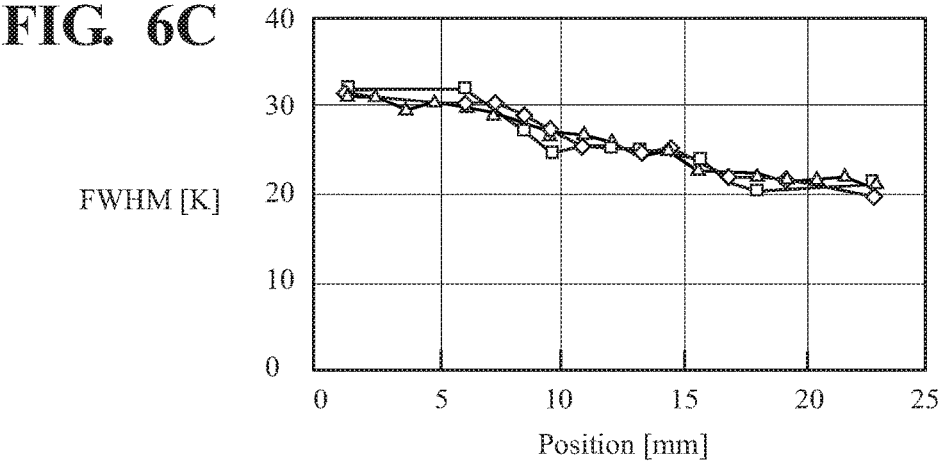
Figure 7A:
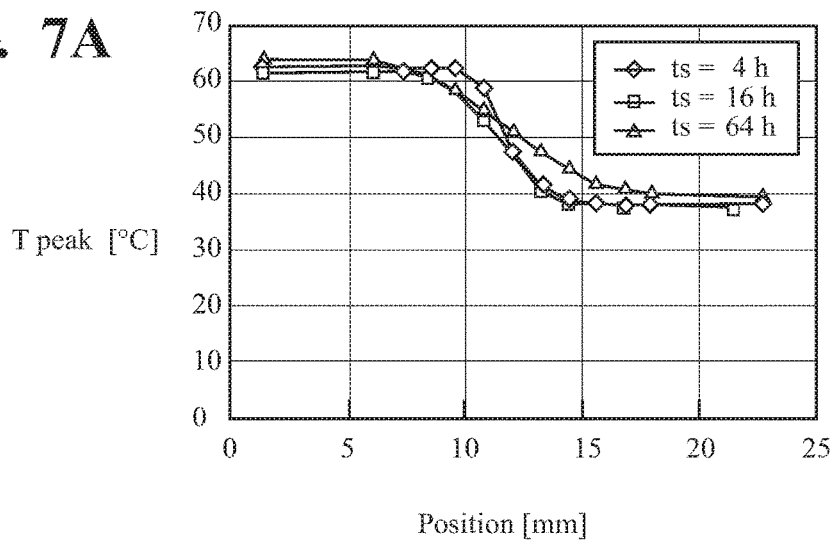
FIGS. 7A-7C illustrate graphs of Curie temperature, maximum temperature change and full width at half maximum value as a function of the position of the slice in a fourth working component.
Figure 7B:
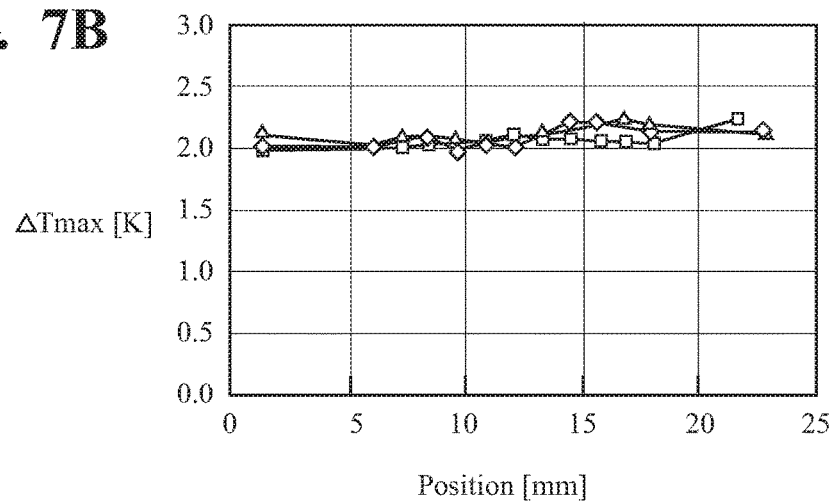
Figure 7C:
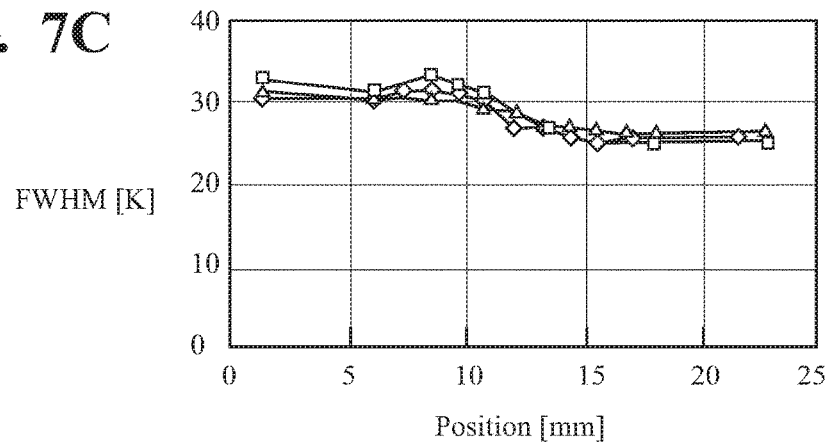

The Curie temperature of the slices was measured with an infrared monitor whilst the test sample rotated in a magnet system so that it was subjected to an alternating external field of 1.6 T and 0 T. FIG. 3 illustrates a typical curve of temperature change as a function of temperature for a single slice.

The peak temperature, which may also be described as the Curie temperature, the maximum temperature change and the full width at half maximum value of the curves is illustrated as a function of the position of the slice in the working component for the working components 1, 2, 3 and 4 in FIGS. 4, 5, 6 and 7, respectively.

Diffusion between the layers of differing composition is seen for each of the working components as the form of the decrease in the Curie temperature becomes smoother and more linear for increasing heat treatment time. The plateaus become shorter and less sharply defined for increasing diffusion times.

Table 4 includes a summary of the measured diffusion zones and Curie temperature gradient of these samples.

Figure 8:
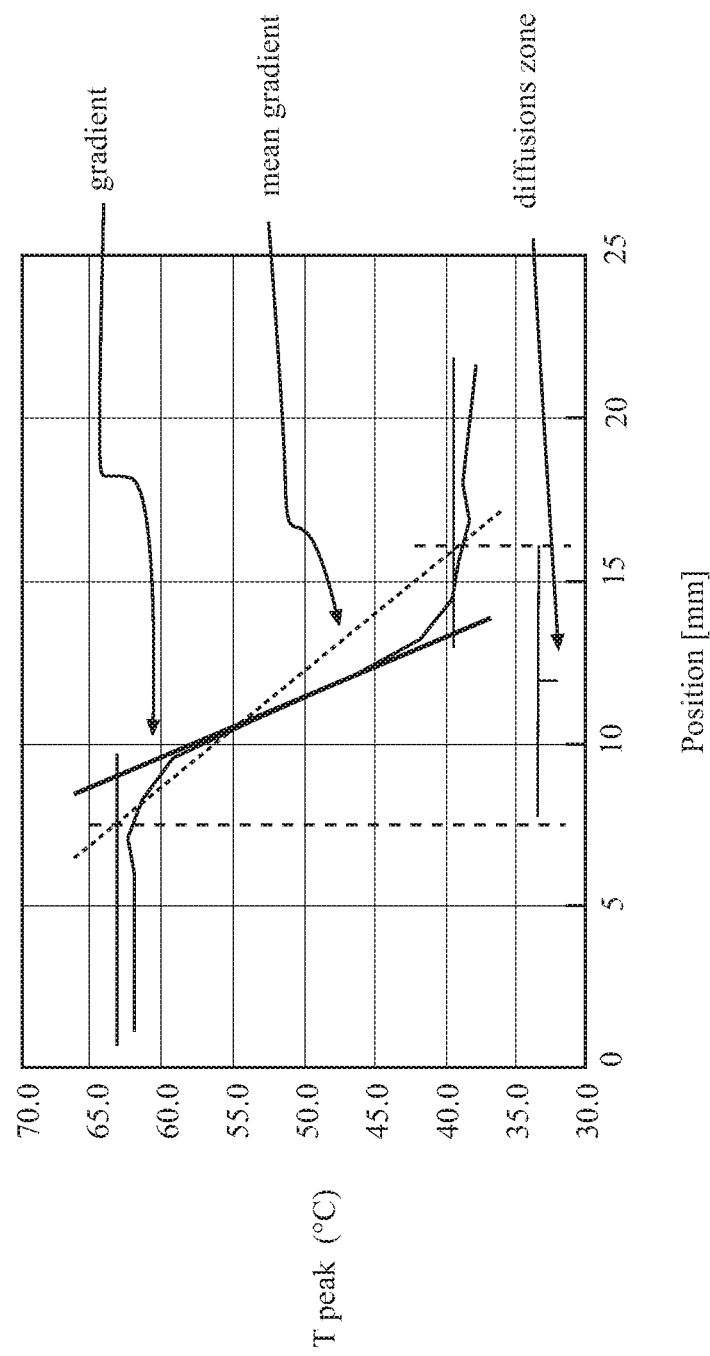
FIG. 8 illustrates a definition of two different Curie temperature gradients and of the diffusion zone used to establish the values given in Table 4.

Two different ways of establishing the Curie temperature gradient are used. FIG. 8 illustrates the two different Curie temperature gradients and the definition of the diffusion zone use to establish the values given in Table 4.

The gradient illustrated with the solid line in FIG. 8 is established by measuring the gradient of the central portion of the diffusion zone by establishing the best fit of this portion of the curve.

The mean gradient, illustrated in FIG. 8 by the dashed line, is the slope of the line connecting the two points in the end zones at which the peak temperature starts to deviate from a constant value. These two endpoints were also used to establish the diffusion zone.

The results may be used to calculate the diffusion coefficient of cobalt in these working components. The calculated values are summarised in Table 5.

Figure 9:
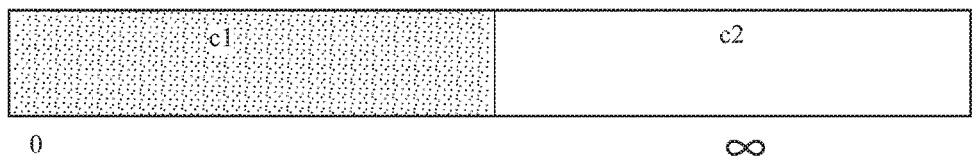
FIG. 9 illustrates a schematic diagram of the concentration profile over the working component at t=0.

The following equation was used which is applicable only for diffusion coefficients which are independent of the concentration of the diffusing element. This factor was assumed in this case. It was assumed that the concentration on the left is c$_1$ and that on the right is c$_2$ and the concentration profile over the working component is known at start point of t=0 as illustrated in FIG. 9 and summarised in the following equation:

$$\frac{\partial c}{\partial t} = D \frac{\partial c^2}{\partial x^2} \qquad (2)$$

The above differential equation can be solved as follows:

$$c(x, t) = \frac{c_1 + c_2}{2} + \frac{c_1 - c_2}{2} \cdot \text{erf}\frac{(x)}{2\sqrt{Dt}} \quad (3)$$

where erf is an error function, t the diffusion time and D is the interdiffusion coefficient.

Table 5 illustrates that the calculated interdiffusion coefficients vary only slightly over the nine samples. The average value is $2.3 \times 10^{-11}$ m$^2$/s.

In a further set of embodiment, a varying carbon content was used to adjust the Curie temperature.

The compositions of the three starting powders are illustrated in Table 6. As in the first set of embodiments, the composition of the three powders was selected so as to produce a Curie temperature of 10° C., 35° C. or 60° C. The carbon content increases from 0.06 weight percent, 0.36 weight percent and 0.68 weight percent for the three powders, respectively.

Green bodies were fabricated from layers of two or three of these powders. The compositions are summarised in Table 7. The fifth green body has a layer with a Curie temperature of 10° C. and a second layer with the Curie temperature of 35° C.

The sixth green body has a first layer having a Curie temperature of 10° C. and a second layer having a Curie temperature of 60° C.

The seventh green body has three layers having the Curie temperatures 10° C., 35° C. and 60° C., respectively.

As in the first set of embodiments, the powder with the lowest Curie temperature was placed in the press first, pressed to form a flat surface before the second powder was placed into the press. In case of the seventh green body with three different differing Curie temperatures, the second layer was pressed to form a flat surface before the powder forming a third layer was placed into the press.

These green bodies were given a sintering and diffusion heat treatment at 1120° C. for 4 hours, 16 hours or 64 hours. The density of the working components after heat treatment of the green bodies is summarised in Table 8.

In this embodiment, the sinter activity was not adjusted for the differing carbon contents by adjusting the silicon content. The working component fabricated from the second sort of powder and heated for 64 hours split into two pieces. It is though that this is a result of the sinter activity being sufficiently different for the two portions of varying carbon content. These results in combination with the sinter density achieved for other carbon and silicon contents, which are summarized in Table 10 and for examples 1 to 3 of Table 13, indicates that the silicon content should be reduced for increased carbon contents.

If aluminium is used instead of silicon, it is expected that the aluminium content also has to be reduced for increasing carbon content as can be seen from the results summarized in Table 16 and Table 17.

Figure 10:
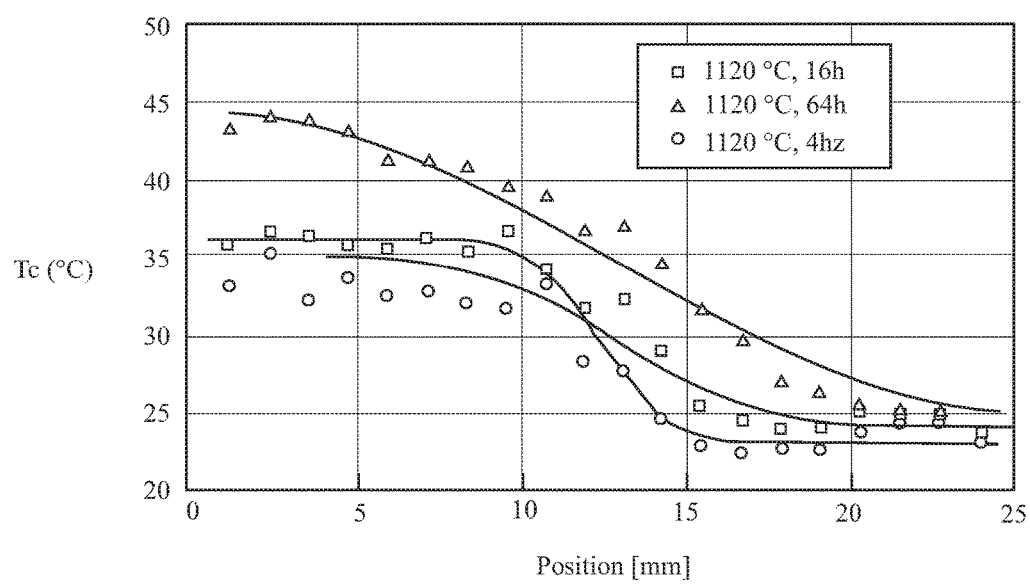
FIG. 10 illustrates the measured Curie temperature as a function of position in a first working component.

FIG. 10 illustrates the measured Curie temperature as a function of position for the fifth working component heat treated at 4 hours, 16 hours and 64 hours. FIG. 10 illustrates that the gradient of the Curie temperature (Curie temperature per unit length) becomes more linear with a less pronounced curve across the interface between the two portions of the green body with increasing diffusion time.

Figure 11:
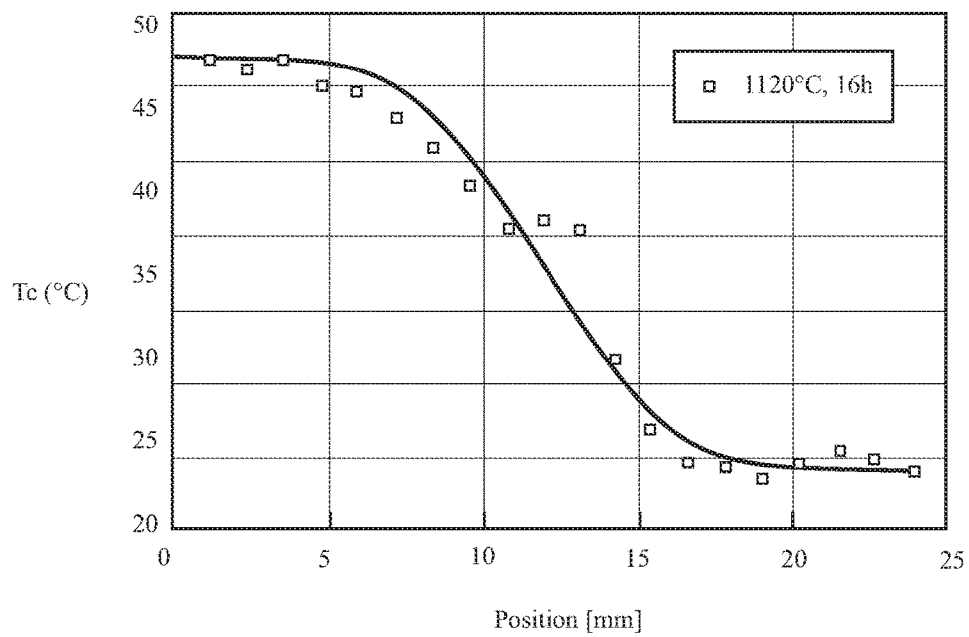
FIG. 11 illustrates a graph of measured Curie temperature as a function of position for a second working component.

FIG. 11 illustrates a graph of measured Curie temperature as a function of position for the working component fabricated from the sixth green body which was heated at 1120° C. for 16 hours.

Figure 12:
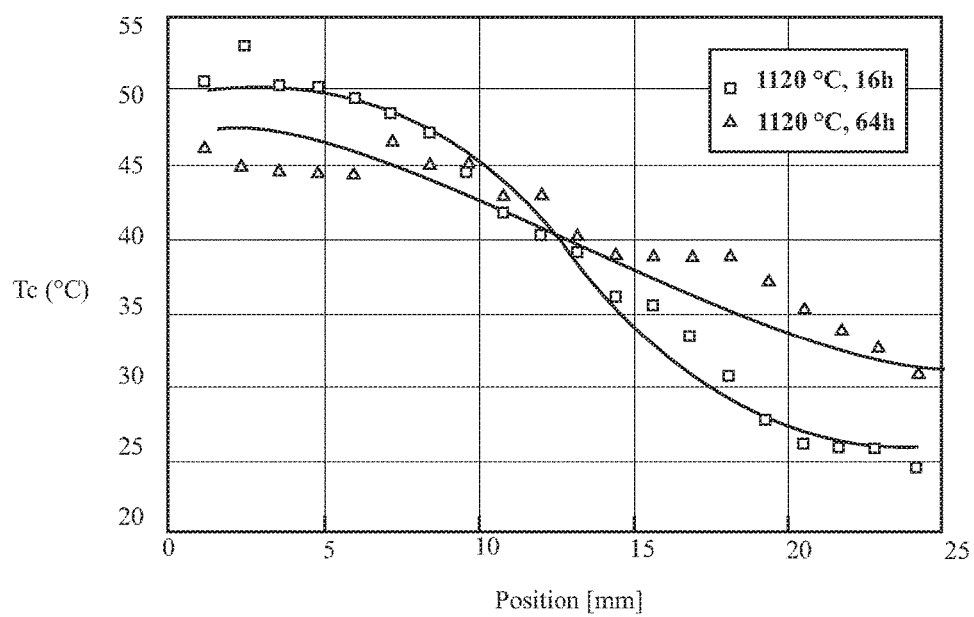
FIG. 12 illustrates a graph of Curie temperature as a function of position for a third working component.

FIG. 12 illustrates a graph of Curie temperature as a function of position for a working component made from the seventh green body which was heated for 16 hours and 64 hours.

FIGS. 10 to 12 illustrate that diffusion between the layers having different carbon compositions has occurred to give a functionally-graded Curie temperature.

The following set of examples was carried out in an attempt to establish whether carbon is accommodated in the NaZn$_{13}$ structure in interstitial positions or at lattice positions.

In the first set of examples, a composition including 16.7 weight percent lanthanum, 3.48 weight percent silicon, 6.55 weight percent cobalt and 73.250% iron was fabricated. This composition should have a Curie temperature of 10° C. In this composition all of the lattice sites should be occupied by these elements.

0.4 weight percent carbon was introduced into a portion of this powder in the form of graphite powder and mixed for 30 minutes with steel balls. This graphite containing powder was mixed in varying proportions with non-graphite containing powder to produce examples of differing carbon content. The compositions are summarised in Table 9.

The samples were heated at one or more of five heat treatment conditions at varying temperatures for 3 hours in vacuum and 1 hour in argon before fast cooling. The sinter temperatures and the density of the samples heated at different temperatures are summarised in Table 10. In order to achieve the highest density, the sinter temperature may be increased for increasing carbon contents.

Figure 13:
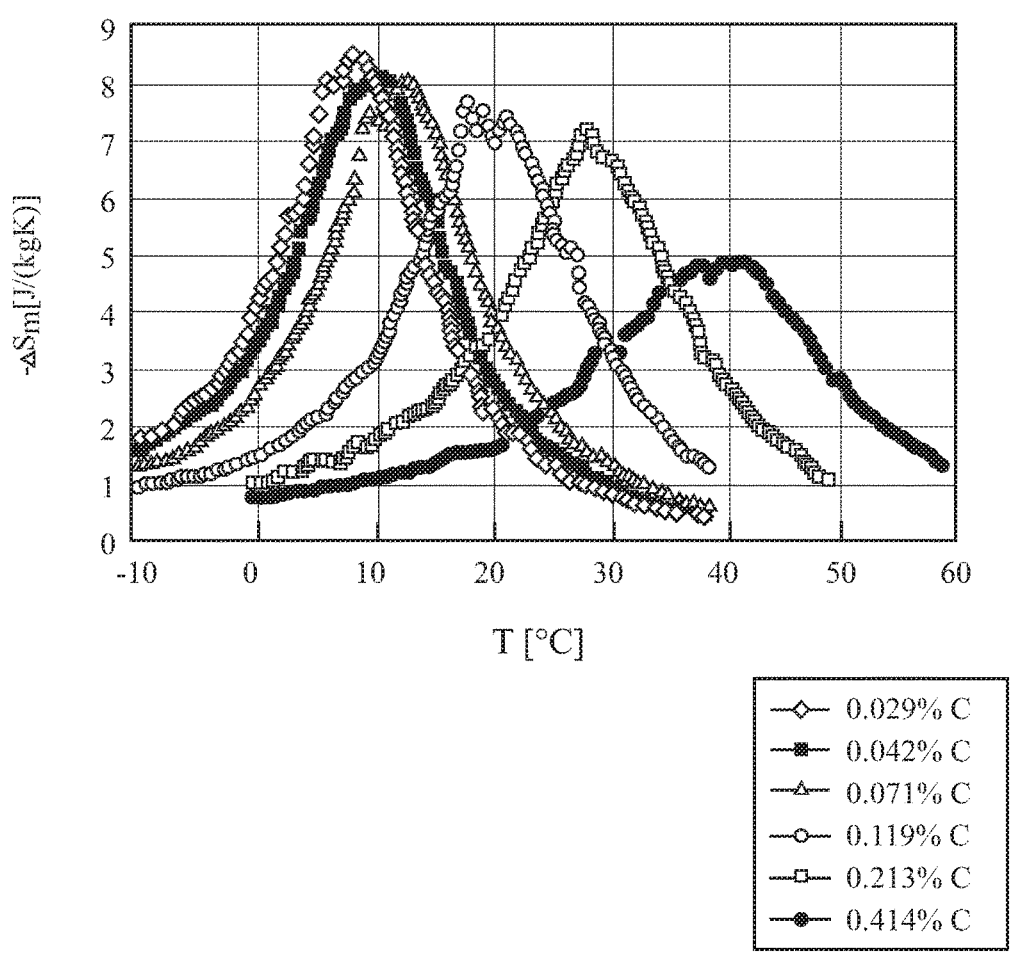
FIG. 13 illustrates a graph of entropy change as a function of temperature for differing carbon contents.
Figure 14A:
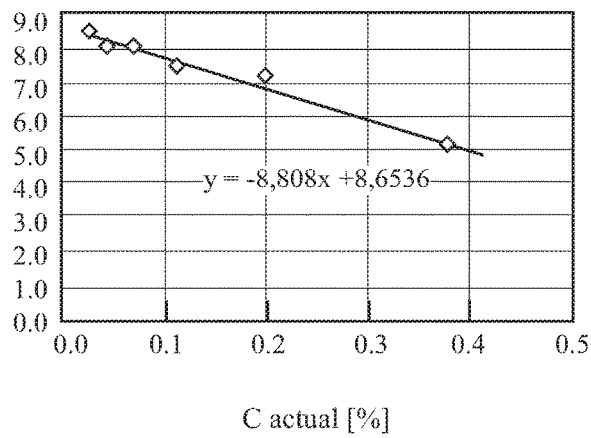
FIGS. 14A-14C illustrate graphs of Curie temperature, entropy change as a function of carbon content and entropy change as a function of Curie temperature.
Figure 14B:
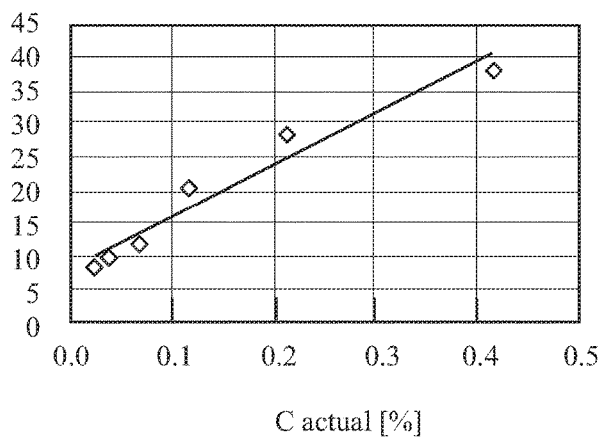
Figure 14C:
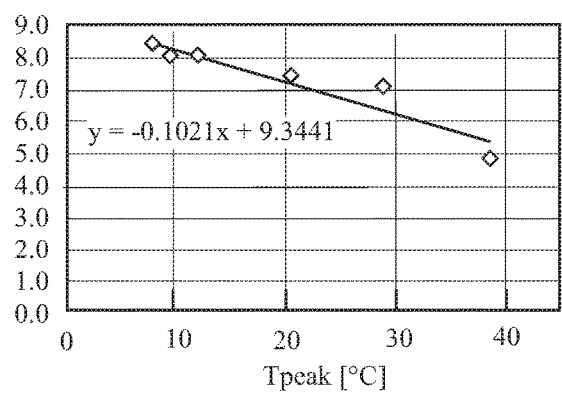

The entropy change as a function of temperature for differing carbon contents is summarised in FIG. 13. As the carbon content increases, the peak temperature, which corresponds to the Curie temperature, increases. The relationship between the Curie temperature, entropy change and carbon content and the relationship between entropy change and Curie temperature are summarised in FIG. 14.

In a further set of examples, carbon was substituted for silicon in a La$_{1-a}$R$_a$(Fe$_{1-x-y}$T$_y$Si$_x$)$_{13}$-based composition. The compositions are summarised in Table 11 and varying portions of the powders were mixed to form six samples of differing carbon and silicon content. The compositions of the six samples are summarised in Table 12. In this set of embodiments, it was attempted to establish whether carbon could replace silicon in the NaZn$_{13}$ structure.

Samples were heated at various sintering temperatures for 3 hours in vacuum followed by 1 hour in argon before fast cooling. The sinter temperature and density measured are summarised in Table 13.

Figure 15A:
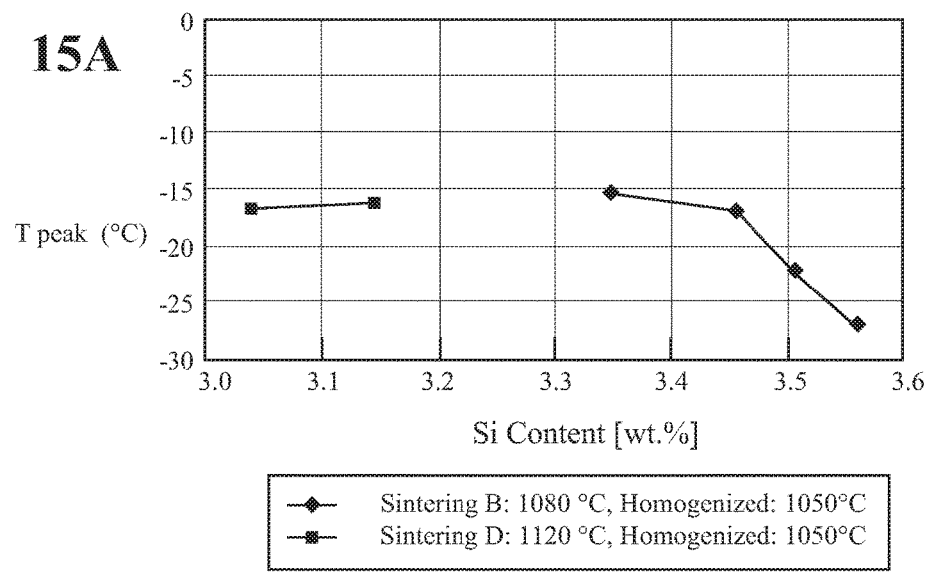
FIGS. 15A and 15B illustrate measured Curie temperatures as a function of silicon content and carbon content.
Figure 15B:
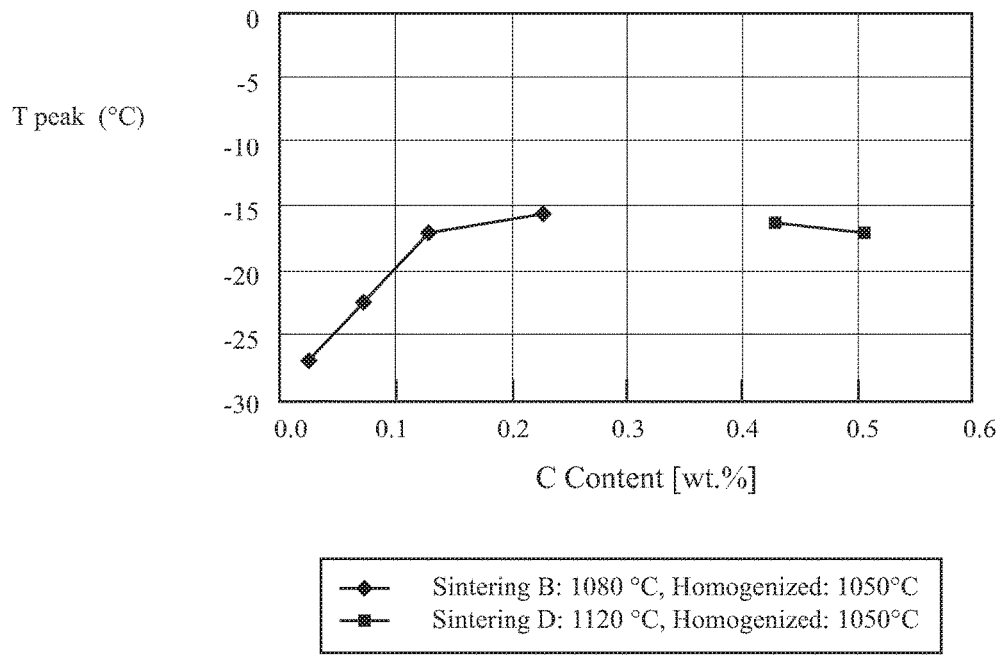

FIG. 15 illustrates the measured Curie temperatures as a function of silicon content and carbon content.

Figure 16A:
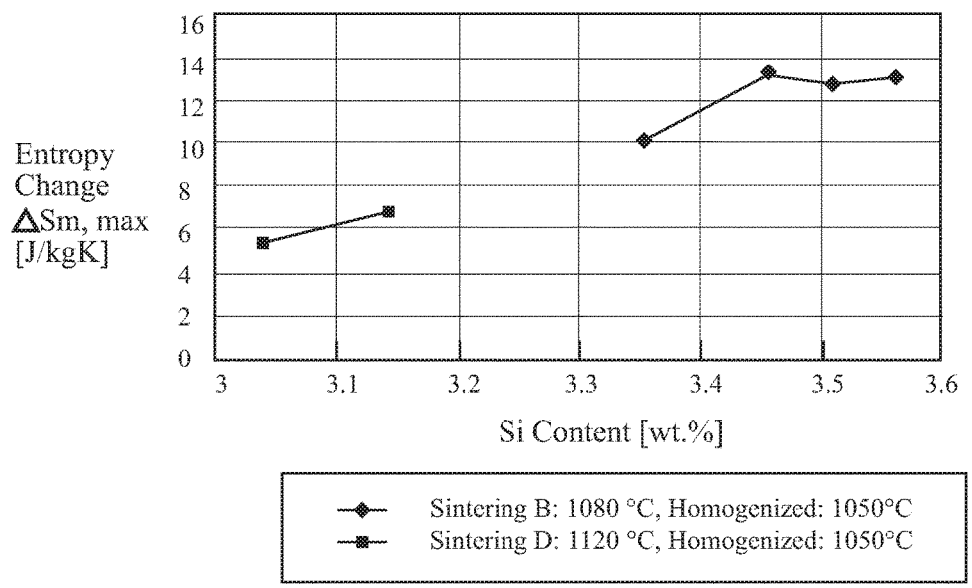
FIGS. 16A and 16B illustrate maximum entropy change as a function of silicon content and carbon content.
Figure 16B:
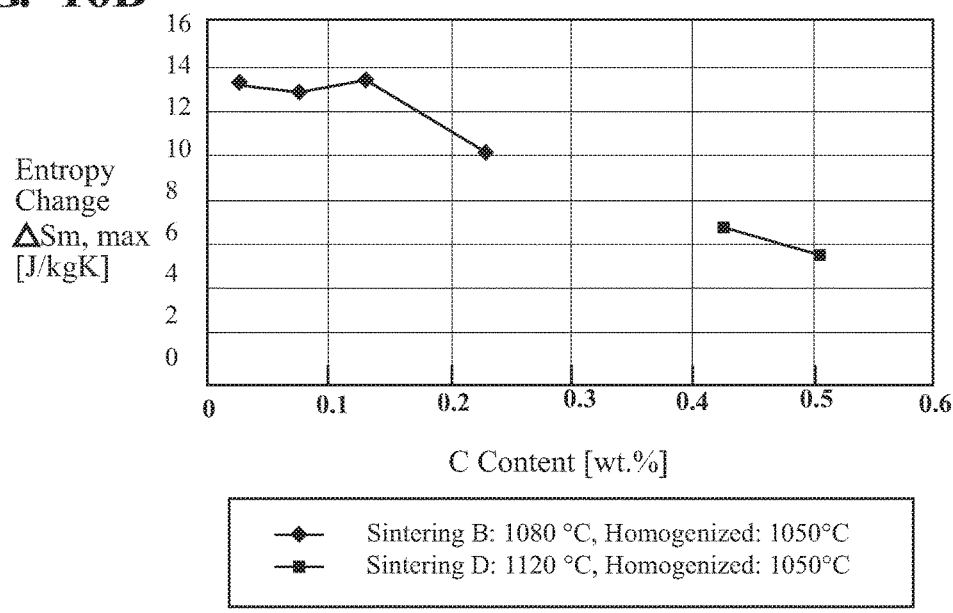

FIG. 16 illustrates the maximum entropy change in an external field of 1.6 T for the samples as a function of silicon content and carbon content.

Samples 1 to 3 illustrate a dependence of the Curie temperature on the silicon and carbon content which can be summarised by the following equation:

$$T_c = 97 \times C - 87.1 \quad (4)$$

wherein C is the carbon content in weight percent.

This is similar to that found in the first set of embodiments. However, samples 4 to 6 are found to exhibit different behaviour and a decrease in Curie temperature. This indicates that carbon does not take the same sites as Si, but is incorporated only on interstitial sites, as is the case for hydrogen. The results also indicate that at least 3.5 weight percent silicon is required to stabilize the NaZn$_{13}$ crystal structure for the entire cobalt content of 3.9 weight percent.

These sets of embodiments illustrate that the sinter activity also depends on the carbon content as well as on the silicon content. Consequently, the silicon content should be adjusted for a given carbon content required to provide a given T$_c$ as well as to provide a uniform sinter activity and uniform resulting density of the working component. This hinders the cracking and/or delamination of portions of the working component. A similar result is expected by adjusting the aluminium content in dependence of the carbon content.

In a further group of embodiments, the effect of varying the silicon and aluminium contenton the sinter density was investigated.

Table 14 summarizes the compositions of six samples of varying Si and Al content. The total content of silicon and aluminium remains largely similar, but the proportion of silicon to aluminium is varied so that sample 1 includes only aluminium and no silicon and sample 6 includes only silicon and no aluminium.

Figure 17:
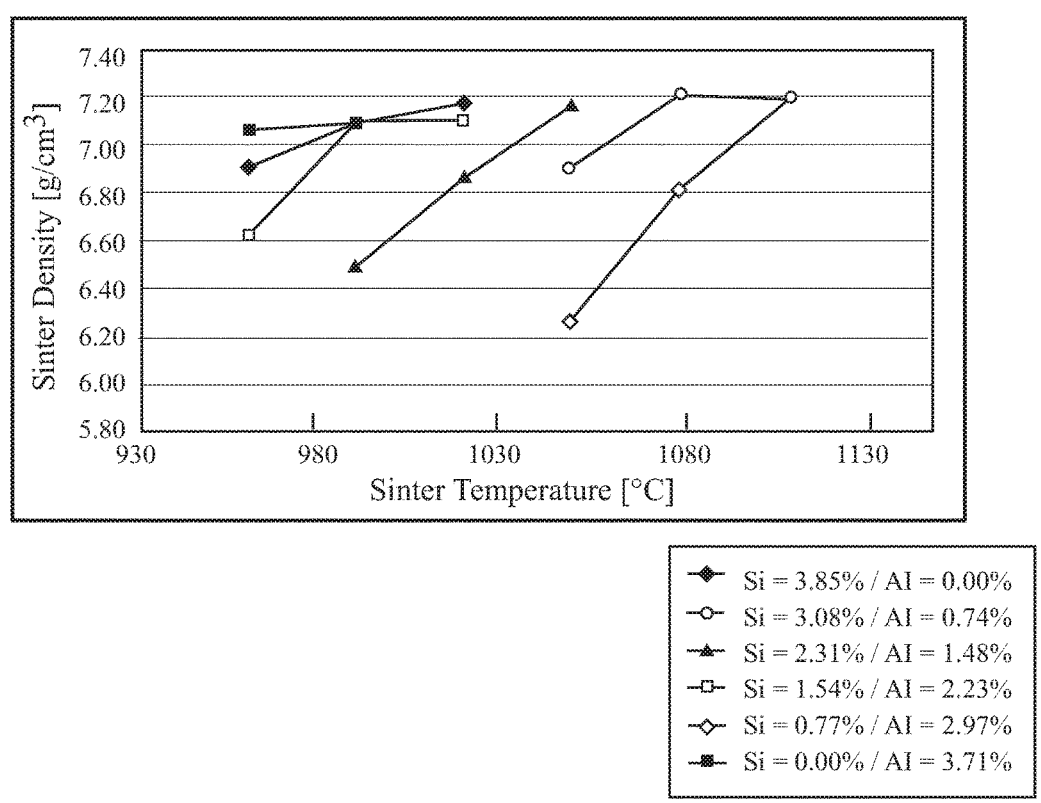
FIG. 17 illustrates a graph of sinter density in dependence of sinter temperature for samples including varying Si and Al contents.

Table 15 summarizes the density of the samples of Table 14 after heat treatment at different temperatures in the range of 960° C. to 1110° C. These results are also illustrated in the draft of FIG. 17.

These results indicate that the aluminium content can also be adjusted to adjust the density of the working component. As the silicon content increases and the aluminium content decreases, the sinter temperature should be increased to achieve a high sinter density.

In a further group of embodiments, the effect of aluminium on the sinter density for samples with no silicon, i.e. silicon-free samples, was investigated.

Table 16 summarizes the compositions of six samples of varying Al content. The samples were heat treated at temperatures between 940° C. and 1040° C. The sinter density of these samples is summarized in Table 17.

Figure 18:
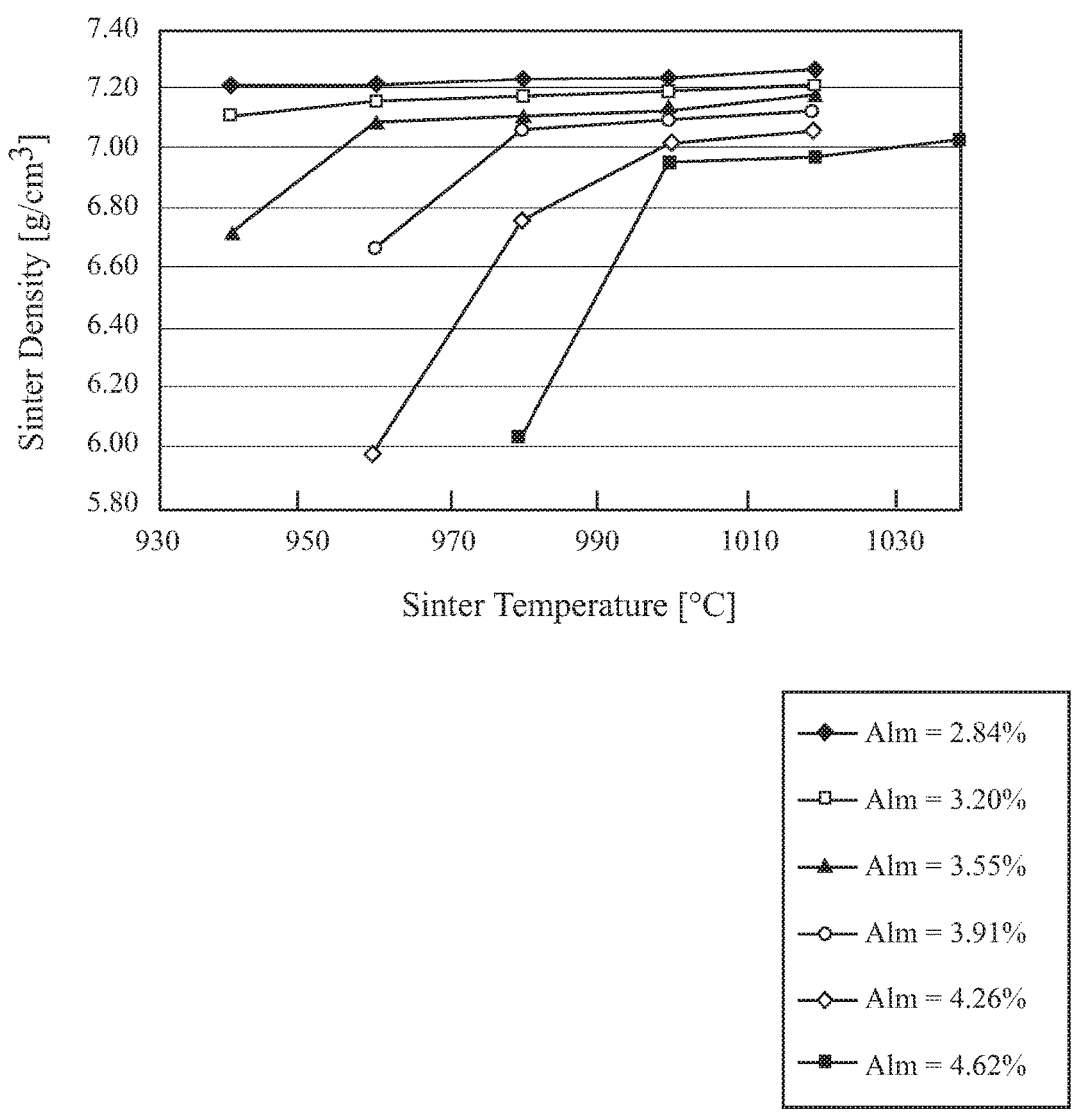
FIG. 18 illustrates a graph of sinter density in dependence of sinter temperature for samples with varying aluminium contents.

FIG. 18 illustrates a graph of sinter density in dependence of sinter temperature for samples with varying aluminium contents.

The results indicate that for increasing Al content, the sinter temperature has to be increased in order to achieve a high sinter density. This trend is comparable to the embodiments in which the samples only contain silicon and no aluminium.

TABLE 1

|  | La$_m$ | Si$_m$ | Co$_m$ | Fe | T$_{peak}$ [ C.] |
|---|---|---|---|---|---|
| MFP-1112 | 16.7 | 3.48 | 6.55 | 73.24 | 10 |
| MFP-1112 + MFP1113 | 16.7 | 3.38 | 8.24 | 71.65 | 35 |
| MFP-1113 | 16.7 | 3.28 | 9.93 | 70.06 | 60 |

TABLE 2

|  | T$_{peak1}$ | T$_{peak2}$ | T$_{peak3}$ |
|---|---|---|---|
| sort 1 | 10 | 60 | n.a. |
| sort 2 | 10 | 35 | n.a. |
| sort 3 | 10 | 35 | 60 |
| sort 4 | 35 | 60 | n.a. |

TABLE 3

| sintering temperature | 1100° C. |
|---|---|
| diffusion times | 4 h |
|  | 16 h |
|  | 64 h |

TABLE 4

|  | time [h] | diffusion zone [mm] | gradient [K/mm] | mean gradient [K/mm] |
|---|---|---|---|---|
| sample 1 | 4 | 4.5 | 15.3 | 10.2 |
|  | 16 | 8.5 | 9.6 | 6 |
|  | 64 | 13 | 6.1 | 3.5 |
| sample 2 | 4 | 4.5 | 7.7 | 4.6 |
|  | 16 | 8.5 | 5 | 2.6 |
|  | 64 | 10 | 3 | 2.1 |
| sample 3 | 4 (l) | 5 | 9.8 | 4.9 |
|  | 4 (r) | 3.5 | 9.6 | 6.8 |
|  | 16 (l) | n.A. | 7 | n.A |
|  | 16 (r) | n.A. | 6 | n.A. |
|  | 64 | 18 | 3.2 | 2.7 |
| sample 4 | 4 | 5.5 | 9.4 | 4.3 |
|  | 16 | 8 | 4.3 | 2.9 |
|  | 64 | 12 | 2.8 | 2 |

TABLE 5

|  | time [h] | D × 10$^{-11}$ [m$^2$/s] | center [mm] |
|---|---|---|---|
| sample 1 | 4 | 2.5 | 12.1 |
|  | 16 | 2.5 | 12.4 |
|  | 64 | 2 | 12.2 |
| sample 2 | 4 | 2.5 | 11.8 |
|  | 16 | 2.5 | 12.2 |
|  | 64 | 2 | 12 |
| sample 4 | 4 | 2.5 | 11.8 |
|  | 16 | 2.5 | 11.5 |
|  | 64 | 2 | 11.8 |
| mean value |  | 2.3 | 12 |

TABLE 6

|  | La (wt. %) | Fe (wt. % ) | Co (wt. %) | Si (wt. %) | C (wt. %) | T$_c$ |
|---|---|---|---|---|---|---|
| MFP-1161 | 17.6 | 72.2 | 6.8 | 3.4 | 0.06 | 10 |
| MFP-1168 | 17.8 | 72 | 6.6 | 3.4 | 0.36 | 35 |
| MFP-1169 | 17.7 | 71.7 | 6.5 | 3.4 | 0.68 | 60 |

TABLE 7

|  | Powder 1 | Powder 2 | Powder 3 |
|---|---|---|---|
| Sample 5 | MFP-1161 | MFP-1168 |  |
| Sample 6 | MFP-1161 | MFP-1169 |  |
| Sample 7 | MFP-1161 | MFP-1168 | MFP-1169 |

TABLE 8

|  | density (g/cm$^3$) | | |
|---|---|---|---|
|  | 4 h | 16 h | 64 h |
| Sample 5 | 7.062 | 7.265 | 7.057 |
| Sample 6 | 6.78 | 7.15 | 7.279/6.860 |
| Sample 7 | 6.7 | 7.12 | 7.09 |

TABLE 9

| sample | $C_{nominally}$ [%] | $C_{actual}$ [%] |
|---|---|---|
| 1 | 0 | 0.029 |
| 2 | 0.02 | 0.042 |
| 3 | 0.05 | 0.071 |
| 4 | 0.1 | 0.119 |
| 5 | 0.2 | 0.213 |
| 6 | 0.4 | 0.414 |

TABLE 10

| | | density (g/cm³) | | | | | |
|---|---|---|---|---|---|---|---|
| sintering | TS (° C.) | 1 | 2 | 3 | 4 | 5 | 6 |
| B | 1080 | 6.992 | 7.058 | 7.02 | 7.06 | | |
| A | 1090 | 7.244 | 7.255 | 7.264 | 7.178 | 7.144 | |
| C | 1100 | 7.308 | 7.274 | 7.201 | 7.255 | 7.148 | 6.546 |
| D | 1120 | | | | | 7.269 | 7.125 |
| E | 1140 | | | | | | 7.255 |

TABLE 11

| | $La_m$ [%] | $Si_m$ [%] | $C_m$ [%] | $Co_m$ [%] | $Fe_m$ [%] | $T_{peak}$ [° C.] |
|---|---|---|---|---|---|---|
| MFP-1155 | 16.7 | 3.63 | 0.03 | 3.92 | 75.72 | −29 |
| MFP-1156 | 16.7 | 3.13 | 0.52 | 3.92 | 75.72 | −29 |

TABLE 12

| sample | $C_{nominally}$ [%] | $C_{analys.}$ [%] | $Si_{nominally}$ [%] |
|---|---|---|---|
| 1 | 0.03 | 0.03 | 3.56 |
| 2 | 0.08 | 0.08 | 3.51 |
| 3 | 0.13 | 0.133 | 3.46 |
| 4 | 0.23 | 0.23 | 3.35 |
| 5 | 0.43 | 0.431 | 3.14 |
| 6 | 0.51 | 0.506 | 3.04 |

TABLE 13

| | | density (g/cm³) | | | | | |
|---|---|---|---|---|---|---|---|
| sintering | TS (° C.) | 1 | 2 | 3 | 4 | 5 | 6 |
| C | 1060 | 6.544 | 6.672 | 6.807 | 6.757 | 6.614 | 6.549 |
| B | 1080 | 7.164 | 7.170 | 7.221 | 7.220 | | |
| A | 1100 | 7.295 | 7.277 | 7.248 | 7.271 | 7.029 | 6.888 |
| D | 1120 | | | | | 7.231 | 7.241 |

TABLE 14

| sample | $La_m$ | $Si_m$ | $Al_m$ | $Fe_m$ |
|---|---|---|---|---|
| 1 | 16.7 | 0.00 | 3.71 | balance |
| 2 | 16.7 | 0.77 | 2.97 | balance |
| 3 | 16.7 | 1.54 | 2.23 | balance |
| 4 | 16.7 | 2.31 | 1.48 | balance |
| 5 | 16.7 | 3.08 | 0.74 | balance |
| 6 | 16.7 | 3.85 | 0.00 | balance |

TABLE 15

| | Density (g/cm³) | | | | | |
|---|---|---|---|---|---|---|
| TS (° C.) | Sample 1 | Sample 2 | Sample 3 | Sample 4 | Sample 5 | Sample 6 |
| 930 | | | | | | |
| 960 | 7.062 | 6.905 | 6.625 | | | |
| 990 | 7.095 | 7.105 | 7.098 | 6.493 | | |
| 1020 | | 7.17 | 7.098 | 6.861 | | |
| 1050 | | | | 7.156 | 6.901 | 6.257 |
| 1080 | | | | | 7.208 | 6.813 |
| 1110 | | | | | 7.195 | 7.185 |

TABLE 16

| sample | $La_m$ | $Al_m$ | $Fe_m$ |
|---|---|---|---|
| 1 | 16.7 | 2.84 | balance |
| 2 | 16.7 | 3.20 | balance |
| 3 | 16.7 | 3.55 | balance |
| 4 | 16.7 | 3.91 | balance |
| 5 | 16.7 | 4.26 | balance |
| 6 | 16.7 | 4.62 | balance |

TABLE 17

| Temperature (° C.) | Density (g/cm³) | | | | | |
|---|---|---|---|---|---|---|
| | Sample 1 | Sample 2 | Sample 3 | Sample 4 | Sample 5 | Sample 6 |
| 1040 | | | | | | 7.036 |
| 1020 | 7.27 | 7.214 | 7.188 | 7.132 | 7.065 | 6.973 |
| 1000 | 7.24 | 7.188 | 7.135 | 7.097 | 7.026 | 6.962 |
| 980 | 7.224 | 7.173 | 7.119 | 7.064 | 6.763 | 6.042 |
| 960 | 7.214 | 7.173 | 7.101 | 6.672 | 5.975 | |
| 960 | 7.194 | 7.157 | 7.093 | | | |
| 940 | 7.208 | 7.114 | 6.72 | | | |

The invention claimed is:
1. A method for fabricating a functionally-graded monolithic sintered working component for magnetic heat exchange, comprising:
providing powder comprising elements in amounts sufficient for forming a $La_{1-a}R_a(Fe_{1-x-y}T_yM_x)_{13}H_zC_b$ phase with a $NaZn_{13}$ structure, wherein T is one or more of the elements selected from the group consisting of Mn, Co, Ni, Ti, V and Cr, M is one or more of the elements selected from the group consisting of Si and Al, and R is one or more of the elements selected from the group consisting of Ce, Nd, Y and Pr, wherein a is such that $0 \leq a \leq 0.5$, b is such that $0 \leq b \leq 1.5$, x is such that $0.05 \leq x \leq 0.2$, y is such that $0 \leq y \leq 0.2$, and z is such that $0 \leq z \leq 3$;
forming the powder to provide a green body in which an amount of at least one element selected from the group consisting of T, R, C and M varies in a pre-determined direction of the green body,
heat treating the green body at a temperature T and for a time t selected to allow diffusion of one or more of the elements selected from the group consisting of T, R and C, and
the heat treating step including forming a sintered working component comprising a Curie temperature that monotonically increases or monotonically decreases in the pre-determined direction, wherein the temperature T and the time t are selected to provide the monotonically increasing or monotonically decreasing Curie temperature, and wherein the monotonically increasing or monotonically decreasing Curie temperature changes with a gradient that lies within +/−50% of a linear function over 80% of a length of the working component, wherein the linear function is defined as the difference between the Curie temperature at one end of the working component and the Curie temperature at the opposing end of the working component divided by the distance between the two ends, and wherein nowhere along the length of the working component is there a gradient that exceeds 10° C./0.5 mm of length.

2. The method according to claim 1, wherein the elements T, or C, or both, are present, and wherein the temperature T is selected to provide a diffusion rate of the elements T, or C, or both of at least $2 \times 10^{-11}$ m²/s.

3. The method according claim 1, wherein the element C is present, and wherein the temperature T is selected to provide a diffusion rate of the element C of at least $1 \times 10^{-10}$ m²/s.

4. The method according to claim 1, wherein the temperature T is 900° C.≤T≤1200° C.

5. The method according to claim 1, wherein the temperature T is 1050° C.≤T≤1150° C.

6. The method according to claim 1, wherein the time t is 1 h≤t≤100 h.

7. The method according to claim 1, further comprising forming the powder from a plurality of powders with each powder comprising different amounts of at least one element selected from the group consisting of R, T, M and C and each powder being selected to provide a different Curie temperature when heat treated to form the $NaZn_{13}$ structure.

8. The method according to claim 7, wherein layers of the plurality of powders are stacked such that the content of at least one element selected from the group consisting of R, T, M and C increases or decreases in a direction of the stack.

9. The method according to claim 7, wherein each of the powders is mixed with a liquid and optionally with a binder and/or a dispersant to form a slurry or paste.

10. The method according to claim 9, wherein the viscosity of the slurry or paste is between 200 mPas and 100,000 mPas.

11. The method according to claim 10, wherein the slurries or pastes are applied to a surface layer by layer to form a stack such that the content of at least one element selected from the group consisting of R, T, M and C increases or decreases in a direction of the stack.

12. The method according to claim 11, wherein each layer in the stack of layers has a thickness of 10 μm to 60 μm.

13. The method according to claim 9, wherein before sintering, the liquid, binder and dispersant, if present, are removed at a temperature of 500° C. or below.

14. The method according to claim 7, wherein varying proportions of the powders are mixed with one another before being arranged in a former such that the content of at least one element selected from the group consisting of R, T, M, and C of the powder in the former increases or decreases over a length of the former.

15. The method according to claim 7, wherein varying proportions of the powders are introduced in a former such that the content of at least one element selected from the group consisting of R, T, M and C increases or decreases in an insertion direction of the powder into the former.

16. The method according to claim 1, wherein the powder is formed into the green body by applying pressure.

17. The method according to claim 1, wherein the green body is sintered at a temperature of 900° C. or greater to produce a density of 90% or more of a theoretical density of the $La_{1-a}R_a(Fe_{1-x-y}T_yM_x)_{13}H_zC_b$ phase with the $NaZn_{13}$ structure.

18. The method according to claim 1, wherein M is Si and the amount of Si is selected according to $Si_m = 3.85 - 0.0573 \times Co_m - 0.045 \times Mn_m^2 + 0.2965 \times Mn_m$, wherein $Si_m$ is the metallic weight fraction of silicon, $Mn_m$ is the metallic weight fraction of manganese and $Co_m$ is the metallic weight fraction of cobalt.

19. The method according to claim 1, wherein M is Si and the amount of Si is selected according to $Si_m = 3.85 - 0.045 \times Mn_m^2 + 0.2965 \times Mn_m + (0.198 - 0.066 \times Mn_m) \times Ce(MM)_m$, wherein $Si_m$ is the metallic weight fraction of silicon, $Mn_m$ is the metallic weight fraction of manganese and $Ce(MM)_m$ is the metallic weight fraction of cerium misch metal.

20. The method according to claim 1, further comprising hydrogenating the working component after the heat treating step.

21. The method according to claim 20, wherein the working component is hydrogenated to produce a working component comprising a hydrogen content z of at least 90% of the hydrogen saturation value, $z_{sat}$, of the $NaZn_{13}$-structure.

22. The method according to claim 20, wherein the working component is hydrogenated to produce a hydrogen content z of 1.4≤z≤3 in the $La_{1-a}R_a(Fe_{1-x-y}T_yM_x)_{13}H_z$ phase.

23. The method according to claim 20, wherein the hydrogenating comprises heat treating under a $H_2$ partial pressure of 0.5 to 2 bar.

24. The method according to claim 20, wherein a $H_2$ partial pressure is increased during hydrogenating.

25. The method according to claim 20, wherein the hydrogenating comprises treating at a temperature in the range 0° C. to 100° C.

26. The method according to claim 25, wherein the hydrogenating comprises treating at a temperature in the range 15° C. to 35° C.

27. The method according to claim 20, wherein the hydrogenating comprises a dwell at a temperature $T_{hyd}$, wherein 300° C.≤$T_{hyd}$≤700° C.

28. The method according to claim 27, wherein the hydrogenating comprises a dwell at a temperature $T_{hyd}$, wherein 300° C.≤$T_{hyd}$≤700° C. followed by cooling in a hydrogen atmosphere to a temperature of less than 100° C.

29. The method according to claim 20, wherein the hydrogenating comprises:
heating the working component from a temperature of less than 50° C. to at least 300° C. in an inert atmosphere,
introducing hydrogen gas only when a temperature of at least 300° C. is reached,
maintaining the working component in a hydrogen containing atmosphere at a temperature in the range 300° C. to 700° C. for a selected duration of time, and
cooling the working component to a temperature of less than 50° C.

30. The method of claim 29, wherein the working component is cooled to a temperature of less than 50° C. in a hydrogen-containing atmosphere.

31. The method according to claim 20, wherein hydrogen gas is introduced after the heat treating step at a temperature of 400° C. to 600° C.

32. The method according to claim 20, wherein after the hydrogenating, the working component comprises at least 0.18 wt % hydrogen.

33. The method according to claim 29, wherein a hydrogen content of the working component is varied as a function of position along a working direction of the working component by introducing a varying amount of hydrogen into, or removing a varying amount of hydrogen, from the working component by heat treating the working component in the temperature gradient to produce the monotonically increasing or monotonically decreasing Curie temperature that increases or decreases monotonically in the pre-determined direction.

34. The method according to claim 1, wherein the monotonically increasing or monotonically decreasing Curie temperature changes with a gradient that lies within +/−10% of the linear function over 80% of a length of the working component.

35. The method according to claim 1, wherein the monotonically increasing or monotonically decreasing Curie temperature changes with a gradient that lies within +/−20% of the linear function over 80% of a length of the working component.

36. A method for fabricating a functionally-graded monolithic sintered working component for magnetic heat exchange, comprising:
providing a plurality of powders comprising elements in amounts sufficient for forming a $La_{1-a}R_a(Fe_{1-x-y}T_yM_x)_{13}H_zC_b$ phase with a $NaZn_{13}$ structure, wherein T is one or more of the elements selected from the group consisting of Mn, Co, Ni, Ti, V and Cr, M is one or more of the elements selected from the group consisting of Si and Al, and R is one or more of the elements selected from the group consisting of Ce, Nd, Y and Pr, wherein a is such that $0 \leq a \leq 0.5$, b is such that $0 \leq b \leq 1.5$, x is such that $0.05 \leq x \leq 0.2$, y is such that $0 \leq y \leq 0.2$, and z is such that $0 \leq z \leq 3$;
mixing the powders with a liquid and optionally with a binder and/or a dispersant to form a green body in the form of a slurry or paste in which an amount of at least one element selected from the group consisting of T, R, C and M varies in a pre-determined direction,
heat treating the green body at a temperature T and for a time t selected to allow diffusion of one or more of the elements selected from the group consisting of T, R and C, and
forming a working component from the green body comprising a Curie temperature that monotonically increases or monotonically decreases in the pre-determined direction, and wherein a gradient of the increase or decrease does not exceed 10° C./0.5 mm anywhere in the working component.

37. A method for fabricating a functionally-graded monolithic sintered working component for magnetic heat exchange, comprising:
providing a plurality of powders comprising elements in amounts sufficient for forming a $La_{1-a}R_a(Fe_{1-x-y}T_yM_x)_{13}H_zC_b$ phase with a $NaZn_{13}$ structure, wherein T is one or more of the elements selected from the group consisting of Mn, Co, Ni, Ti, V and Cr, M is one or more of the elements selected from the group consisting of Si and Al, and R is one or more of the elements selected from the group consisting of Ce, Nd, Y and Pr, wherein a is such that $0 \leq a \leq 0.5$, b is such that $0 \leq b \leq 1.5$, x is such that $0.05 \leq x \leq 0.2$, y is such that $0 \leq y \leq 0.2$, and z is such that $0 \leq z \leq 3$;
mixing the powders with a liquid and optionally with a binder and/or a dispersant to form a green body in the form of a slurry or paste in which an amount of at least one element selected form the group consisting of T, R, C and M varies in a pre-determined direction, the slurry or paste having a viscosity between 200 mPas and 100,000 mPas,
heat treating the green body at a temperature T and for a time t selected to allow diffusion of one or more of the elements selected from the group consisting of T, R and C,
forming a working component from the green body comprising a Curie temperature that monotonically increases or monotonically decreases in the pre-determined direction.

38. A method for fabricating a functionally-graded monolithic sintered working component for magnetic heat exchange, comprising:
providing a plurality of powders comprising elements in amounts sufficient for forming a $La_{1-a}R_a(Fe_{1-x-y}T_yM_x)_{13}H_zC_b$ phase with a $NaZn_{13}$ structure, wherein T is one or more of the elements selected from the group consisting of Mn, Co, Ni, Ti, V and Cr, M is one or more of the elements selected from the group consisting of Si and Al, and R is one or more of the elements selected from the group consisting of Ce, Nd, Y and Pr, wherein a is such that $0 \leq a \leq 0.5$, b is such that $0 \leq b \leq 1.5$, x is such that $0.05 \leq x \leq 0.2$, y is such that $0 \leq y \leq 0.2$, and z is such that $0 \leq z \leq 3$;
mixing the powders with a liquid and optionally with a binder and/or a dispersant to form a green body in the form of a slurry or paste in which an amount of at least one element selected from the group consisting of T, R, C and M varies in a pre-determined direction,
applying the slurry or paste to a surface layer by layer to form a stack such that the content of at least one element selected from the group consisting of R, T, C and M increases or decreases in a direction of the stack,
heat treating the green body at a temperature T and for a time t selected to allow diffusion of one or more of the elements selected from the group consisting of T, R and C,
forming a working component from the green body comprising a Curie temperature that monotonically increases or monotonically decreases in the pre-determined direction, and wherein a gradient of the increase or decrease does not exceed 10° C./0.5 mm anywhere in the working component.

39. A method for fabricating a functionally-graded monolithic sintered working component for magnetic heat exchange, comprising:
providing powder comprising elements in amounts sufficient for forming a $La_{1-a}R_a(Fe_{1-x-y}T_yM_x)_{13}H_zC_b$ phase with a $NaZn_{13}$ structure, wherein T is one or more of the elements selected from the group consisting of Mn, Co, Ni, Ti, V and Cr, M is one or more of the elements selected from the group consisting of Si and Al, and R is one or more of the elements selected from the group consisting of Ce, Nd, Y and Pr, wherein a is such that $0 \leq a \leq 0.5$, b is such that $0 \leq b \leq 1.5$, x is such that $0.05 \leq x \leq 0.2$, y is such that $0 \leq y \leq 0.2$, and z is such that $0 \leq z \leq 3$;
mixing the powders with a liquid and optionally with a binder and/or a dispersant to form a green body in the form of a slurry or paste in which an amount of at least one element selected from the group consisting of T, R, C and M varies in a pre-determined direction,
applying the slurry or paste to a surface layer by layer to form a stack, each layer in the stack having a thickness of 10 μm to 60 μm, heat treating the green body at a temperature T and for a time t selected to allow diffusion of one or more of the elements selected from the group consisting of T, R and C, and forming a working component comprising a Curie temperature that monotonically increases or monotonically decreases in the pre-determined direction.

\* \* \* \* \*